(12) United States Patent
McCormick

(10) Patent No.: US 7,814,838 B2
(45) Date of Patent: Oct. 19, 2010

(54) GAS GENERATING SYSTEM

(75) Inventor: David M. McCormick, St. Clair Shores, MI (US)

(73) Assignee: Automotive Systems, Laboratory, Inc., Armada, MI (US)

( * ) Notice: Subject to any disclaimer, the term of this patent is extended or adjusted under 35 U.S.C. 154(b) by 1152 days.

(21) Appl. No.: 11/167,849

(22) Filed: Jun. 27, 2005

(65) Prior Publication Data
US 2006/0005734 A1   Jan. 12, 2006

Related U.S. Application Data

(60) Provisional application No. 60/583,427, filed on Jun. 28, 2004.

(51) Int. Cl.
C06D 5/00 (2006.01)
B60R 21/26 (2006.01)

(52) U.S. Cl. ........................... 102/530; 280/740

(58) Field of Classification Search ...... 280/736–743.2; 102/530
See application file for complete search history.

(56) References Cited

U.S. PATENT DOCUMENTS

| | | | | |
|---|---|---|---|---|
| 1,939,700 | A * | 12/1933 | Hofstetter | 89/14.2 |
| 1,990,837 | A * | 2/1935 | Morgenstern | 181/255 |
| 2,101,848 | A * | 12/1937 | Green | 89/14.5 |
| 2,216,653 | A * | 10/1940 | Sauer | 181/262 |
| 2,891,525 | A | 6/1959 | Moore | 123/90.51 |

(Continued)

FOREIGN PATENT DOCUMENTS

DE   40 19 877 A1   6/1990

DE   42 27 547 A1   2/1994

(Continued)

OTHER PUBLICATIONS

WO 98/39183; Title: Multi-Chamber Inflator; International Publication Date: Sep. 11, 1998; Inventors: Shahid A. Siddiqui and Rickey Lee Stratton; Applicant: Automotive Systems Laboratory, Inc.

(Continued)

Primary Examiner—Troy Chambers
(74) Attorney, Agent, or Firm—L. C. Begin & Associates, PLLC

(57) ABSTRACT

A gas generating system (10) including a baffle system (42) for modifying the temperature and pressure of a gas generated by the system, and to remove particulates from the gas. The gas generating system includes a first combustion chamber (34a), a second combustion chamber (36a), and the baffle system (42) adjacent both the first and second combustion chambers so as to enable fluid communication with the combustion chambers upon activation of the gas generating system. In another aspect of the present invention, a baffle system (42) is provided including a first end plate (44) having an opening (44b) formed therein for enabling fluid communication with a first fluid source (34a), a second end plate (46) having an opening (46b) formed therein for enabling fluid communication with a second fluid source (36a), and a sequence of baffle elements (48) extending between the first and second end plates. A first baffle element (48a) of the sequence of baffle elements defines a chamber (60) for receiving therein a fluid through the openings in the first and second end plates. Each additional baffle element in the sequence of baffle elements is spaced outwardly apart from a preceding baffle element in the sequence of baffle elements. In another aspect of the invention, a method is provided for producing, in a gas generating system, a gas having a pressure within a predetermined pressure range and a temperature within a predetermined temperature range. In another aspect of the present invention, a vehicle occupant protection system is provided.

11 Claims, 5 Drawing Sheets

U.S. PATENT DOCUMENTS

| | | | |
|---|---|---|---|
| 2,959,127 A * | 11/1960 | Weinert | 102/368 |
| 3,310,070 A * | 3/1967 | Black | 137/637.1 |
| 3,733,180 A * | 5/1973 | Heineck et al. | 422/167 |
| 3,787,010 A * | 1/1974 | Meranshian et al. | 244/146 |
| 3,794,347 A | 2/1974 | Zens | 280/150 |
| 3,877,882 A * | 4/1975 | Lette et al. | 422/164 |
| 3,880,447 A | 4/1975 | Thorn et al. | |
| 3,958,949 A | 5/1976 | Plantif et al. | |
| 3,985,076 A | 10/1976 | Schneiter et al. | |
| 4,001,750 A | 1/1977 | Scherer et al. | 337/280 |
| 4,012,189 A | 3/1977 | Vogt et al. | 431/353 |
| 4,215,631 A | 8/1980 | Rucker | 102/27 |
| 4,251,005 A * | 2/1981 | Sons et al. | 220/563 |
| 4,530,516 A | 7/1985 | Adams et al. | 280/741 |
| 4,588,043 A * | 5/1986 | Finn | 181/223 |
| 4,611,374 A | 9/1986 | Schnelle et al. | 29/890.13 |
| 4,722,551 A | 2/1988 | Adams | |
| 4,730,558 A | 3/1988 | Florin et al. | 102/218 |
| 4,762,067 A | 8/1988 | Barker et al. | 102/313 |
| 4,767,067 A | 8/1988 | Bruer et al. | 102/333 |
| 4,886,293 A | 12/1989 | Weiler et al. | |
| 4,950,458 A | 8/1990 | Cunningham | 422/164 |
| 5,028,070 A | 7/1991 | Bender | |
| 5,048,862 A | 9/1991 | Bender et al. | |
| 5,100,171 A * | 3/1992 | Faigle et al. | 280/736 |
| 5,215,721 A | 6/1993 | Tasaki et al. | |
| 5,294,244 A | 3/1994 | Allerton, III et al. | 75/401 |
| 5,318,323 A | 6/1994 | Pietz | 280/736 |
| 5,333,656 A | 8/1994 | Mackal | 141/330 |
| 5,340,150 A | 8/1994 | Harada et al. | |
| 5,372,449 A | 12/1994 | Bauer et al. | 403/273 |
| 5,387,009 A | 2/1995 | Lauritzen et al. | |
| 5,406,889 A | 4/1995 | Letendre et al. | |
| 5,443,286 A | 8/1995 | Cunningham et al. | |
| 5,466,420 A | 11/1995 | Parker et al. | |
| 5,509,686 A | 4/1996 | Shepherd et al. | 280/738 |
| 5,516,147 A | 5/1996 | Clark et al. | 280/737 |
| 5,533,751 A | 7/1996 | Kort et al. | 280/737 |
| 5,556,439 A | 9/1996 | Rink et al. | 55/487 |
| 5,562,304 A | 10/1996 | Gest | 280/740 |
| 5,564,743 A | 10/1996 | Marchant | 280/741 |
| 5,582,427 A | 12/1996 | Rink et al. | 280/740 |
| 5,588,676 A | 12/1996 | Clark et al. | 280/741 |
| 5,609,360 A | 3/1997 | Faigle et al. | 280/740 |
| 5,611,566 A | 3/1997 | Simon et al. | 280/736 |
| 5,613,703 A | 3/1997 | Fischer | 280/741 |
| 5,622,380 A | 4/1997 | Khandhadia et al. | 280/736 |
| 5,624,133 A | 4/1997 | Wong | |
| 5,624,134 A | 4/1997 | Iwai et al. | |
| 5,628,528 A | 5/1997 | DeSautelle et al. | 280/736 |
| 5,630,619 A | 5/1997 | Buchanan et al. | 280/741 |
| 5,662,722 A | 9/1997 | Shiban | 55/413 |
| 5,702,494 A | 12/1997 | Tompkins et al. | 55/498 |
| 5,725,245 A | 3/1998 | O'Driscoll et al. | |
| 5,799,973 A | 9/1998 | Bauer et al. | 280/741 |
| 5,813,695 A | 9/1998 | O'Driscoll et al. | |
| 5,829,785 A | 11/1998 | Jordan et al. | 280/741 |
| 5,845,935 A | 12/1998 | Enders et al. | 280/743.2 |
| 5,860,672 A | 1/1999 | Petersen | 280/728.2 |
| 5,872,329 A | 2/1999 | Burns et al. | 149/36 |
| 5,934,705 A | 8/1999 | Siddiqui et al. | 280/741 |
| 5,941,562 A | 8/1999 | Rink et al. | 280/741 |
| 5,970,880 A | 10/1999 | Perotto | 102/531 |
| 6,019,389 A | 2/2000 | Burgi et al. | 280/736 |
| 6,032,979 A | 3/2000 | Mossi et al. | 280/741 |
| 6,074,502 A | 6/2000 | Burns et al. | |
| 6,095,556 A | 8/2000 | Bailey et al. | 280/737 |
| 6,095,559 A * | 8/2000 | Smith et al. | 280/741 |
| 6,095,561 A | 8/2000 | Siddiqui et al. | 280/472 |
| 6,106,000 A | 8/2000 | Stewart | 280/728.2 |
| 6,116,491 A | 9/2000 | Katoh | 228/42 |
| 6,149,193 A | 11/2000 | Canterberry et al. | 280/741 |
| 6,210,505 B1 | 4/2001 | Khandhadia et al. | 149/36 |
| 6,231,075 B1 * | 5/2001 | Otsu | 280/735 |
| 6,244,623 B1 | 6/2001 | Moore et al. | 280/741 |
| 6,379,627 B1 * | 4/2002 | Nguyen et al. | 422/165 |
| 6,464,254 B2 | 10/2002 | Chikaraishi et al. | 280/741 |
| 6,474,684 B1 | 11/2002 | Ludwig et al. | |
| 6,485,051 B1 | 11/2002 | Taguchi et al. | |
| 6,575,074 B1 * | 6/2003 | Gaddini | 89/14.4 |
| 6,581,963 B2 | 6/2003 | Mangum | 280/741 |
| 6,709,012 B1 | 3/2004 | Tanaka et al. | |
| 6,764,096 B2 | 7/2004 | Quioc | |
| 6,776,434 B2 | 8/2004 | Ford et al. | 280/729 |
| 6,846,014 B2 | 1/2005 | Rink et al. | 280/740 |
| 6,851,705 B2 | 2/2005 | Young et al. | |
| 6,860,510 B2 | 3/2005 | Ogawa et al. | 280/736 |
| 6,871,873 B2 | 3/2005 | Quioc et al. | 280/741 |
| 6,908,104 B2 | 6/2005 | Canterbery et al. | 280/736 |
| 6,929,284 B1 | 8/2005 | Saso et al. | |
| 6,935,655 B2 | 8/2005 | Longhurst et al. | 280/736 |
| 6,945,561 B2 | 9/2005 | Nakashima et al. | |
| 6,948,737 B2 | 9/2005 | Ohji et al. | |
| 6,976,702 B2 | 12/2005 | Yokota et al. | 280/730.2 |
| 7,073,820 B2 | 7/2006 | McCormick | 280/741 |
| 7,137,339 B2 * | 11/2006 | Bierwirth et al. | 102/202 |
| 7,178,830 B2 | 2/2007 | Blackburn | 280/736 |
| 7,185,588 B2 * | 3/2007 | Clark et al. | 102/530 |
| 7,237,801 B2 | 7/2007 | Quioc et al. | 280/736 |
| 7,267,365 B2 | 9/2007 | Quioc | 280/736 |
| 7,316,417 B2 * | 1/2008 | Young et al. | 280/737 |
| 7,343,862 B2 | 3/2008 | McCormick | 102/530 |
| 7,367,584 B2 * | 5/2008 | Blackburn | 280/736 |
| 7,390,019 B2 | 6/2008 | Gotoh et al. | 280/741 |
| 7,654,565 B2 | 2/2010 | McCormick et al. | 280/736 |
| 2002/0053789 A1 | 5/2002 | Fujimoto | |
| 2003/0034637 A1 * | 2/2003 | Wang et al. | 280/729 |
| 2003/0127840 A1 | 7/2003 | Nakashima et al. | |
| 2003/0155757 A1 | 8/2003 | Larsen et al. | 280/741 |
| 2003/0201628 A1 | 10/2003 | Choudhury et al. | 280/729 |
| 2004/0046373 A1 | 3/2004 | Wang et al. | |
| 2005/0001414 A1 | 1/2005 | Matsuda et al. | 280/736 |
| 2005/0134031 A1 | 6/2005 | McCormick | 280/741 |
| 2005/0161925 A1 | 7/2005 | Blackburn | |
| 2005/0189755 A1 * | 9/2005 | Numoto et al. | 280/741 |
| 2005/0194772 A1 | 9/2005 | Numoto et al. | 280/741 |
| 2005/0230949 A1 * | 10/2005 | Blackburn | 280/736 |
| 2005/0263993 A1 | 12/2005 | Blackburn | |
| 2005/0263994 A1 | 12/2005 | Quioc | 280/741 |
| 2005/0280252 A1 | 12/2005 | McCormick | |
| 2006/0005734 A1 | 1/2006 | McCormick | |
| 2006/0043716 A1 | 3/2006 | Quioc | |
| 2006/0082112 A1 | 4/2006 | Blackburn | 280/736 |
| 2006/0261584 A1 | 11/2006 | Blackburn | 280/741 |
| 2006/0273564 A1 | 12/2006 | McCormick et al. | 280/740 |
| 2007/0001438 A1 | 1/2007 | Patterson et al. | 280/740 |
| 2008/0118408 A1 | 5/2008 | Numoto et al. | 422/167 |

FOREIGN PATENT DOCUMENTS

| | | |
|---|---|---|
| EP | 0602785 B1 | 10/1993 |
| EP | 0728633 A1 | 2/1996 |
| EP | 0844149 A1 | 11/1997 |
| EP | 0 864 470 A1 | 9/1998 |
| EP | 1122134 B1 | 7/2000 |
| EP | 1308353 A2 | 9/2002 |
| JP | 04055151 A | 2/1992 |
| JP | 05096147 | 4/1993 |
| JP | 05178155 A | 7/1993 |
| JP | 05178156 A | 7/1993 |
| JP | 06227358 A | 8/1994 |
| WO | WO 98/39183 | 9/1998 |
| WO | WO 2004/091982 A1 | 10/2004 |
| WO | WO 2005/035312 A2 | 4/2005 |

| WO | WO 2005/058645 A2 | 6/2005 |
| WO | WO 2005/086917 | 9/2005 |
| WO | WO 2006/044516 A2 | 4/2006 |
| WO | WO 2006/078819 A2 | 7/2006 |

OTHER PUBLICATIONS

Office Action U.S. Appl. No. 11/479,494, filed Jun. 30, 2006 Dated for Nov. 12, 2008.
U.S. Appl. No. 11/251,255.
U.S. Appl. No. 11/358,786.
Office Action for U.S. Appl. No. 11/140,055, filed May 27, 2005 dated for Apr. 20, 2007.
Office Action for U.S. Appl. No. 11/140,055, filed May 27, 2005 dated for Dec. 12, 2007.
Office Action for U.S. Appl. No. 11/445,859, filed Jun. 1, 2006 dated for Mar. 4, 2008.
Office Action U.S. Appl. No. 11/591,321 Filed Oct. 31, 2006 Dated for Mar. 24, 2009 (133).
Office Action U.S. Appl. No. 11/479,494, filed Jun. 30, 2006 Dated for May 15, 2009 (128).
Office Action U.S. Appl. No. 11/358,786, filed Feb. 21, 2006 dated for Mar. 21, 2008.
Office Action U.S. Appl. No. 11/358,786, filed Feb. 21, 2006 dated for Sep. 18, 2008.
Office Action U.S. Appl. No. 11/445,859, filed Jun. 1, 2006 dated for Sep. 18, 2008.
Office Action U.S. Appl. No. 11/445,859, filed Jun. 1, 2006 Dated for Feb. 25, 2009 (125).
Office Action U.S. Appl. No. 11/591,321, filed Oct. 31, 2006 Dated for Jan. 29, 2010 (133).
Office Action U.S. Appl. No. 11/591,321, filed Oct. 31, 2006 Dated for Sep. 9, 2009 (133).

* cited by examiner

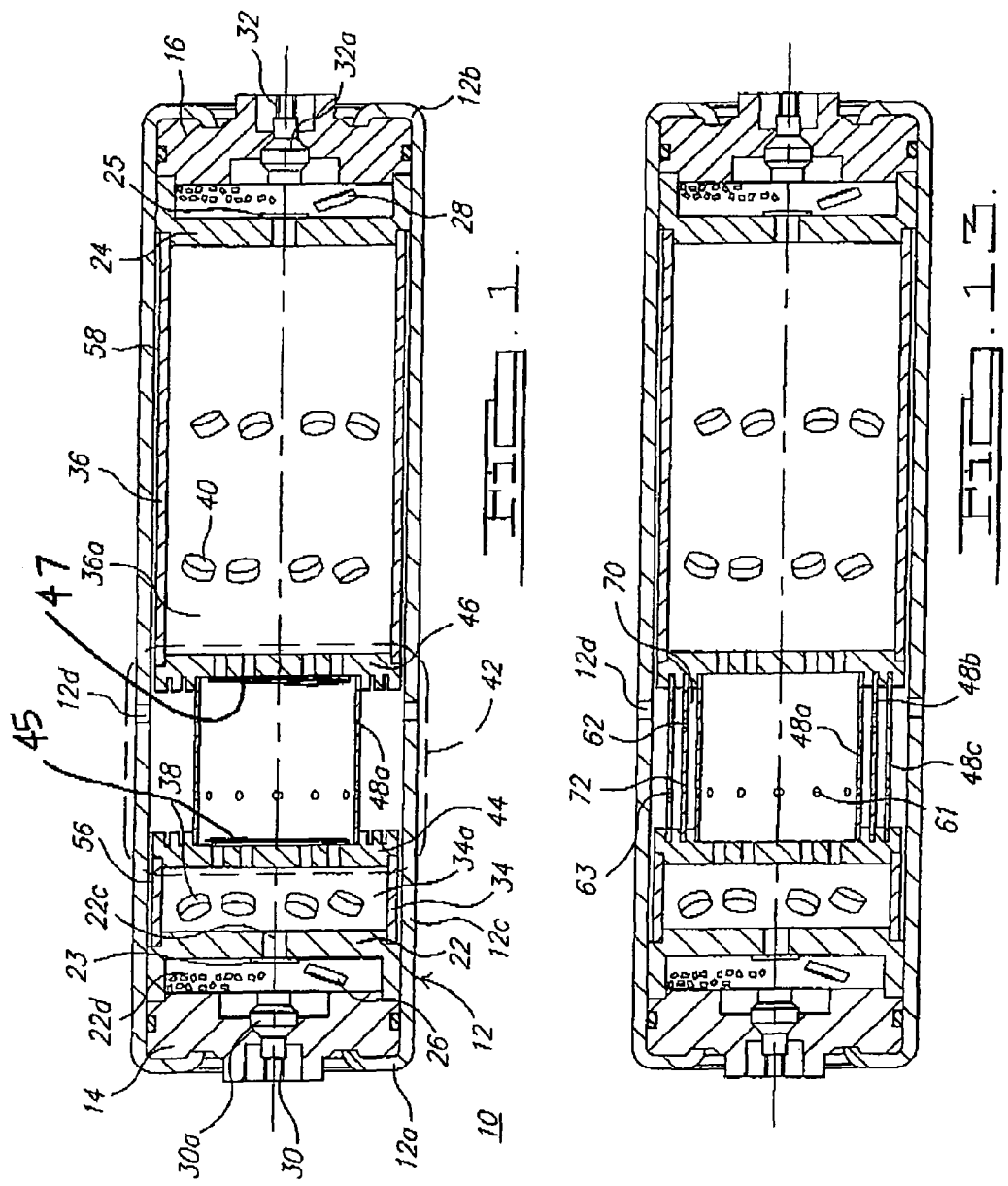

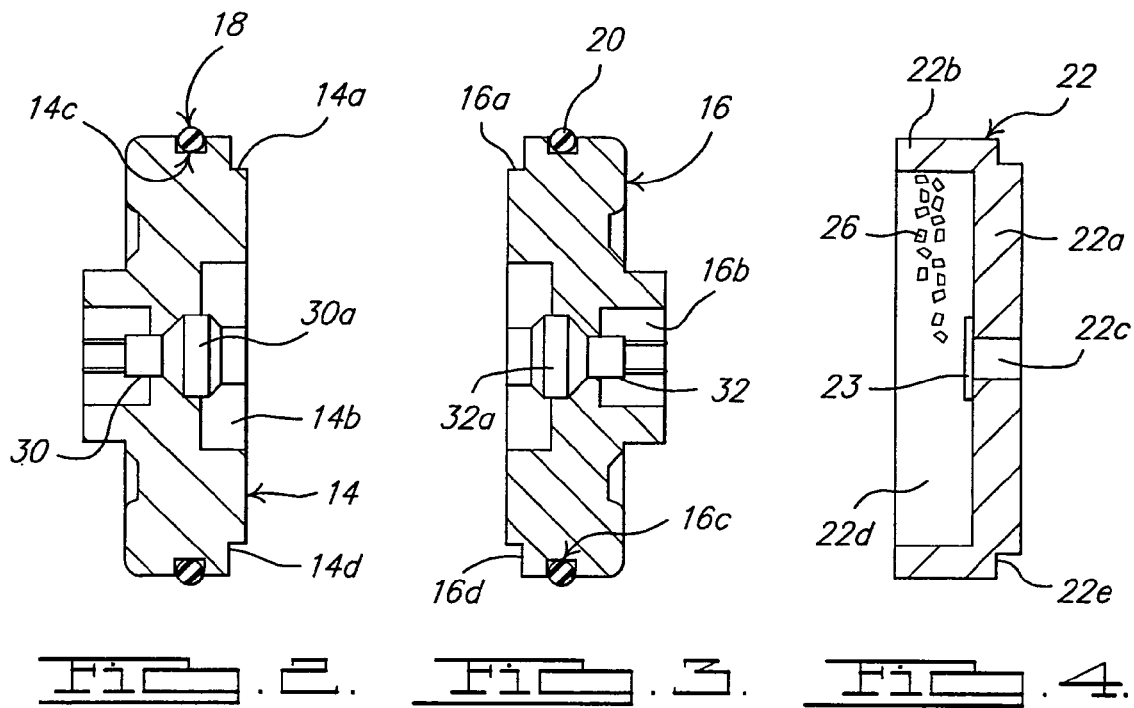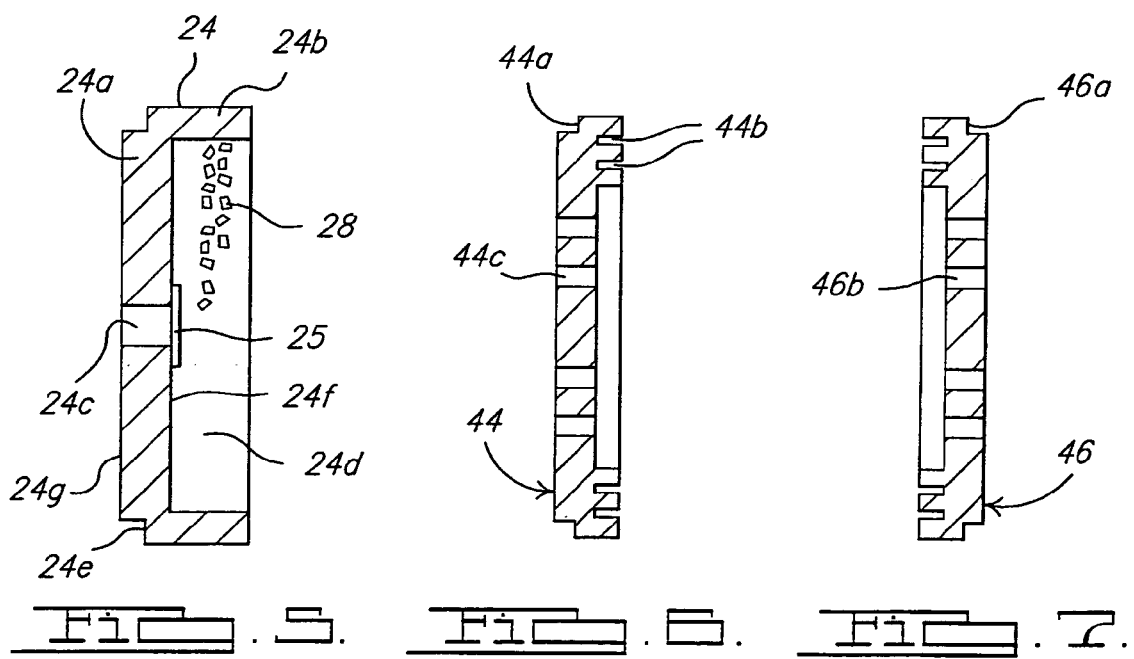

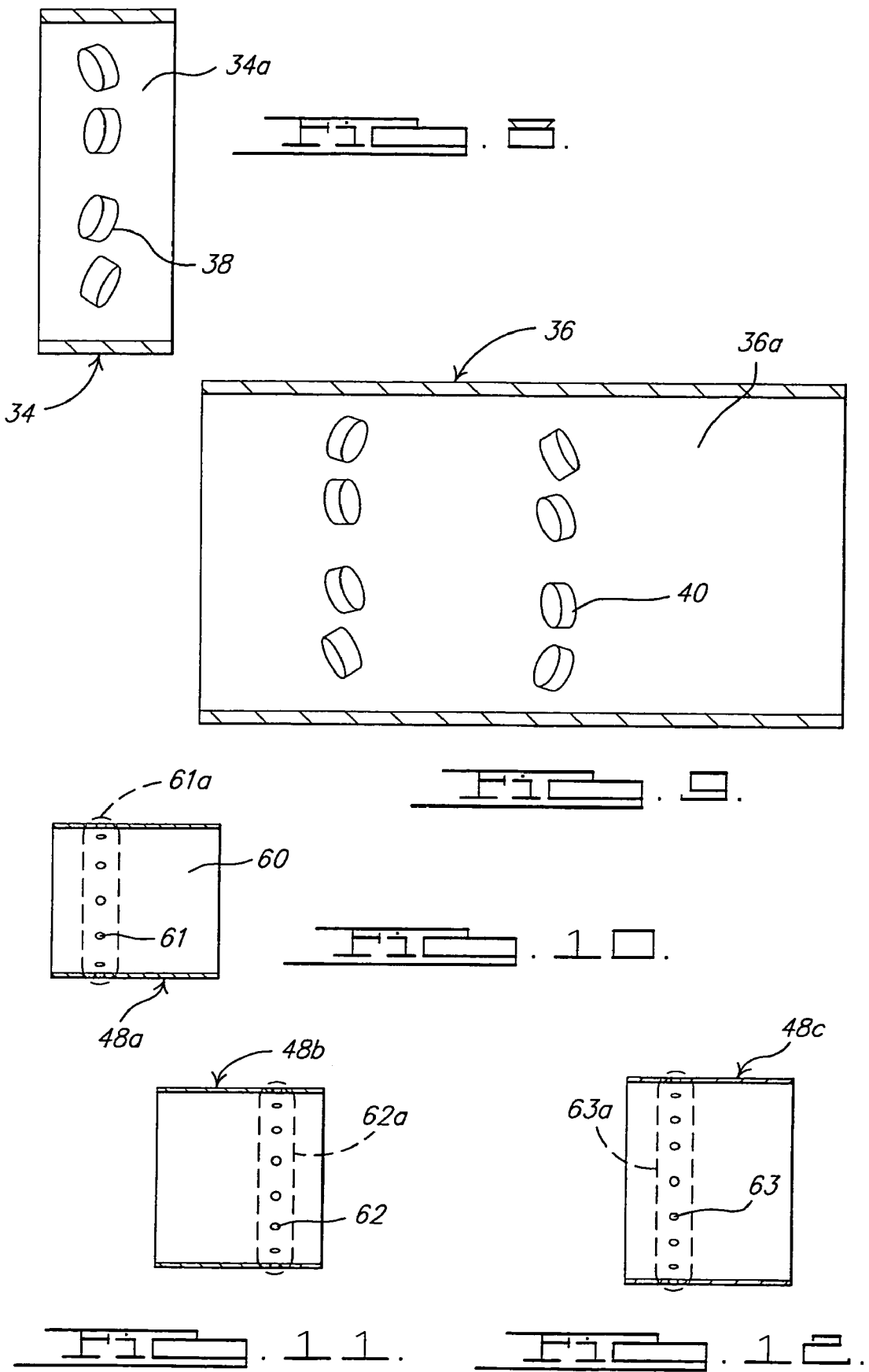

GAS GENERATING SYSTEM

CROSS-REFERENCE TO RELATED APPLICATIONS

This application claims the benefit of provisional application Ser. No. 60/583,427 filed on Jun. 28, 2004.

BACKGROUND OF THE INVENTION

The present invention relates generally to gas generating systems and, more particularly, to filterless gas generating systems for use in applications such as inflatable occupant restraint systems in motor vehicles.

Installation of inflatable occupant protection systems, generally including airbag systems as standard equipment in all new vehicles has intensified the search for smaller, lighter and less expensive protection systems. Accordingly, since the inflation gas generator used in such protection systems tends to be the heaviest and most expensive component, there is a need for a lighter and less expensive gas generating system.

A typical gas generating system includes cylindrical steel or aluminum housing having a diameter and length related to the vehicle application and characteristics of a gas generant composition contained therein. Inhalation by a vehicle occupant of particulates generated by gas generant combustion during airbag activation can be hazardous. Thus, the gas generating system is generally provided with an internal or external filter comprising one or more layers of steel screen of varying mesh and wire diameter. Gas produced upon combustion of the gas generant passes through the filter before exiting the gas generating system. Particulate material, or slag, produced during combustion of the gas generant in a conventional system is substantially removed as the gas passes through the filter. In addition, heat from combustion gases is transferred to the material of the filter as the gases flow through the filter. Thus, as well as filtering particulates from the gases, the filter acts to cool the combustion gases prior to dispersal into an associated airbag. However, inclusion of the filter in the gas generating system increases the complexity, weight, and expense of the gas generating system. While various gas generant formulations have been developed in which the particulates resulting from combustion of the gas generant are substantially eliminated or significantly reduced, certain types of gas generants are still desirable notwithstanding the relatively high percentage of combustion solids they produce, given favorable characteristics of these gas generants such as burn rate, sustained combustion, and repeatability of performance.

Other ongoing concerns with gas generating systems include the ability to achieve any one of a variety of ballistic profiles by varying as few of the physical parameters of the gas generating system as possible and/or by varying these physical parameters as economically as possible. Also important are the need to increase manufacturing efficiency and the need to reduce manufacturing costs.

SUMMARY OF THE INVENTION

The present invention provides a multi-chamber gas generating system which utilizes a baffle system to modify the temperature and pressure of a generated gas, and to remove particulates from the gas. In one embodiment, the gas generating system includes a first combustion chamber, a second combustion chamber, and the baffle system which is positioned adjacent both the first and second combustion chambers so as to enable fluid communication with the first combustion chamber and the second combustion chamber upon activation of the gas generating system.

In another aspect of the present invention, a baffle system is provided including a first end plate having an opening formed therein for enabling fluid communication with a first fluid source, a second end plate having an opening formed therein for enabling fluid communication with a second fluid source, and a sequence of baffle elements extending between the first and second end plates. A first baffle element defines a chamber for receiving therein a fluid through the openings in the first and second end plates. Each additional baffle element in the sequence is spaced outwardly apart from a preceding baffle element in the sequence of baffle elements. The first baffle element also has an orifice configuration for enabling fluid communication between the first baffle element chamber and one of the additional baffle elements. Each additional baffle element in the sequence also has an orifice configuration for enabling fluid communication between a preceding baffle element and an exterior of the additional baffle element.

In yet another aspect of the present invention, a method is provided for producing, in a gas generating system, a gas having a pressure within a predetermined pressure range and a temperature within a predetermined temperature range. The method includes the steps of a) estimating a total length of a flow path of a gas along a given surface area of a predetermined baffle element material necessary to cool a gas to from a first temperature to a temperature within the predetermined temperature range; and b) providing a baffle system having a total internal gas flow path length per unit baffle element surface area substantially equal to the estimated length of gas flow path necessary to cool the gas to from a first temperature to a temperature within the predetermined temperature range, the baffle system having a baffle system orifice configuration within the baffle system along the internal flow path for the gas, the baffle system orifice configuration being adapted for modifying a pressure of a gas from a first pressure to a second pressure within the predetermined pressure range.

In yet another aspect of the present invention, a vehicle occupant protection system is provided comprising an airbag system including an airbag and a gas generating system coupled to the airbag so as to enable fluid communication with the airbag upon activation of the airbag system. The gas generating system has a first combustion chamber, a second combustion chamber, and a baffle system positioned adjacent both the first and second combustion chambers so as to enable fluid communication with the first combustion chamber and the second combustion chamber upon activation of the gas generating system.

BRIEF DESCRIPTION OF THE DRAWINGS

In the drawings illustrating embodiments of the present invention:

FIG. 1 is a cross-sectional side view of one embodiment of a gas generating system in accordance with the present invention;

FIG. 2 is a cross-sectional side view of a first end closure in accordance with the present invention;

FIG. 3 is a cross-sectional side view of a second end closure in accordance with the present invention;

FIG. 4 is a cross-sectional side view of a first ignition cup in accordance with the present invention;

FIG. 6 is a cross-sectional side view of a first end plate in accordance with the present invention;

FIG. 7 is a cross-sectional side view of a second end plate in accordance with the present invention;

FIG. 8 is a cross-sectional side view of a first annular sleeve in accordance with the present invention;

FIG. 9 is a cross-sectional side view of a second annular sleeve in accordance with the present invention;

FIG. 10 is a cross-sectional side view of a first baffle plate in accordance with the present invention;

FIG. 11 is a cross-sectional side view of a second baffle plate in accordance with the present invention;

FIG. 12 is a cross-sectional side view of a third baffle plate in accordance with the present invention;

FIG. 13 is a cross-sectional side view of a second embodiment of a gas generating system in accordance with the present invention;

FIG. 16 is a schematic representation of an exemplary vehicle occupant restraint system incorporating an inflator in accordance with the present invention.

DETAILED DESCRIPTION

Figure 14:
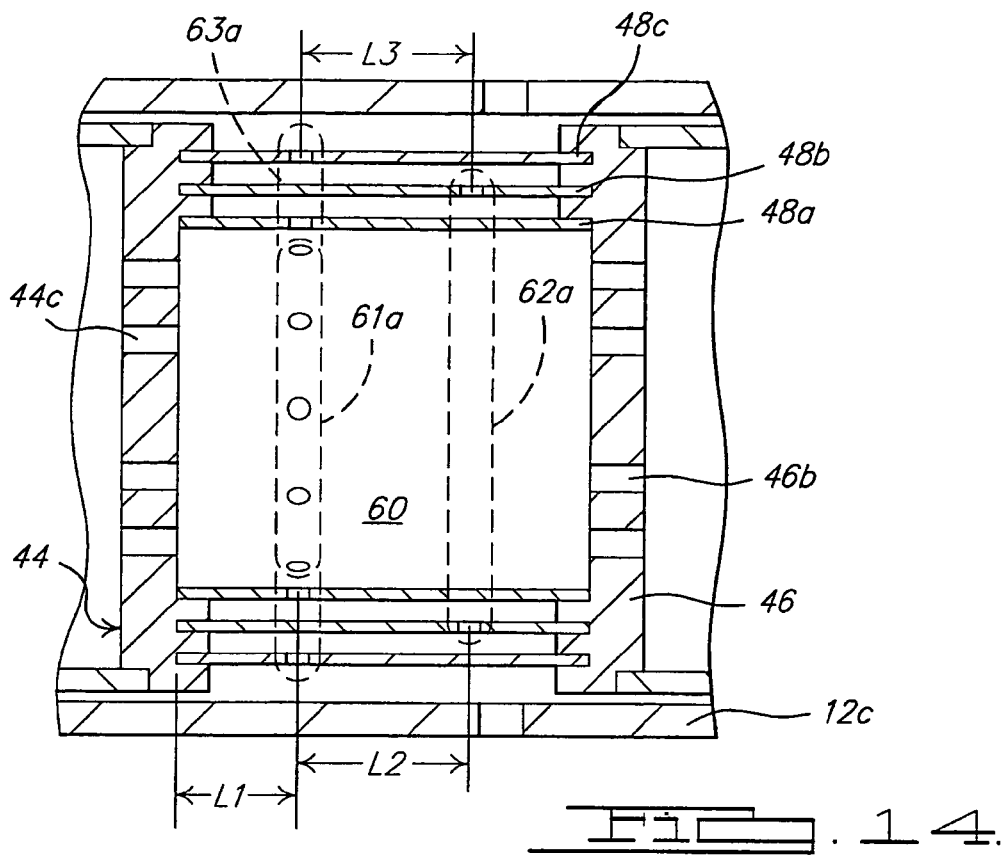
FIG. 14 is a cross-sectional side view of a baffle system in accordance with the present invention.

The present invention broadly comprises a gas generating system that is fabricated without the wire mesh filter required in earlier designs for removing particulate materials from a stream of inflation gas. A baffle system is employed in place of the filter whereby, upon gas generant combustion, slag is formed within the buffer system and gases are also cooled therein. Selection of suitable gas generant compositions capable of combusting to produce inflation gas without an undue quantity of particulates further obviates the need for a filter. Obviating the need for a filter enables the gas generating system to be simpler, lighter, less expensive, and easier to manufacture. Furthermore, the gas generating system described herein actually provides cooler output gases than many known inflators equipped with a typical filter/heat sink. Although the embodiments of the gas generating system described herein do not contain a filter, a filter formed by known or otherwise suitable methods may be included, if desired.

FIG. 1 shows one embodiment of a gas generating system 10 in accordance with the present invention. Gas generating system 10 includes a substantially cylindrical housing 12 having a pair of opposed ends 12a, 12b and a wall 12c extending between the ends to define a housing interior cavity. Housing 12 is made from a metal or metal alloy and may be a cast, stamped, drawn, extruded, or otherwise metal-formed. A first end closure 14 is secured to end 12a of housing 12, and a second end closure 16 is secured to an opposite end 12b of housing 12 using one or more known methods. In FIG. 1, ends 12a and 12b of housing 12 are crimped over portions of first and second end closures 14, 16 to secure the end closures within the housing. One or more openings 12d are provided in housing wall 12c to enable fluid communication between an interior of the housing and an exterior of the housing.

Referring to FIGS. 1 and 2, first end closure 14 has formed therealong a peripheral shoulder 14a, a central orifice 14b, and a peripheral cavity 14c. Peripheral shoulder 14a is formed along a face 14d of the end closure and is dimensioned so that an end portion of a wall 22b of an ignition cup 22 (FIG. 4, described in greater detail below) having a predetermined outer diameter may be positioned along face 14d to form an interference fit with shoulder 14a, thereby suspending the ignition cup radially inward of housing wall 14. A first O-ring or seal 18 is positioned in peripheral cavity 14c to seal the interface between first end closure 14 and housing wall 12c.

Referring to FIGS. 1 and 3, second end closure 16 has formed therealong a peripheral shoulder 16a, a central orifice 16b, and a peripheral cavity 16c. Peripheral shoulder 16a is formed along a face 16d of the end closure and is dimensioned so that an end portion of a wall 24b of an ignition cup 24 (FIG. 5, described in greater detail below) having a predetermined outer diameter may be positioned along face 16d to form an interference fit with shoulder 16a, thereby suspending the ignition cup radially inward of housing wall 12c. A second O-ring or seal 20 is positioned in peripheral cavity 16c to seal the interface between second end closure 16 and housing wall 12c. End closures 14, 16 may be stamped, extruded, die cast, or otherwise metal formed and may be made from carbon steel or stainless steel, for example.

Referring to FIGS. 1 and 4, a first ignition cup 22 is positioned adjacent first end closure 14, and is nested within housing 12 for a portion of the housing length. Ignition cup 22 has a base portion 22a and a wall 22b extending from the base portion to abut first end closure 14 along first end closure shoulder 14a. Base portion 22a, wall 22b, and first end closure 14 define a cavity 22d for containing a pyrotechnic compound 26 therein. At least one ignition gas exit orifice 22c is formed in ignition cup 22 for release of ignition compound combustion products once ignition compound 26 is ignited. An annular recess 22e is formed in base portion 22a and is dimensioned so that an end portion of an annular sleeve 34 (described below) having a predetermined inner diameter may be positioned within recess 22e to form an interference fit with base portion 22a. Ignition cup 22 may be stamped, extruded, die cast, or otherwise metal formed and may be made from carbon steel or stainless steel, for example.

In the embodiment shown in FIG. 1, a rupturable, fluid-tight seal 23 is positioned across ignition orifice 22c to fluidly isolate cavity 22d from a first combustion chamber 34a (described below) prior to activation of the gas generating system. Seal 23 is secured to a face of ignition cup base portion 22a and forms a fluid-tight barrier between cavity 22d and combustion chamber 34a. Various disks, foils, films, tapes, etc. may be used to form the seal.

Figure 5:
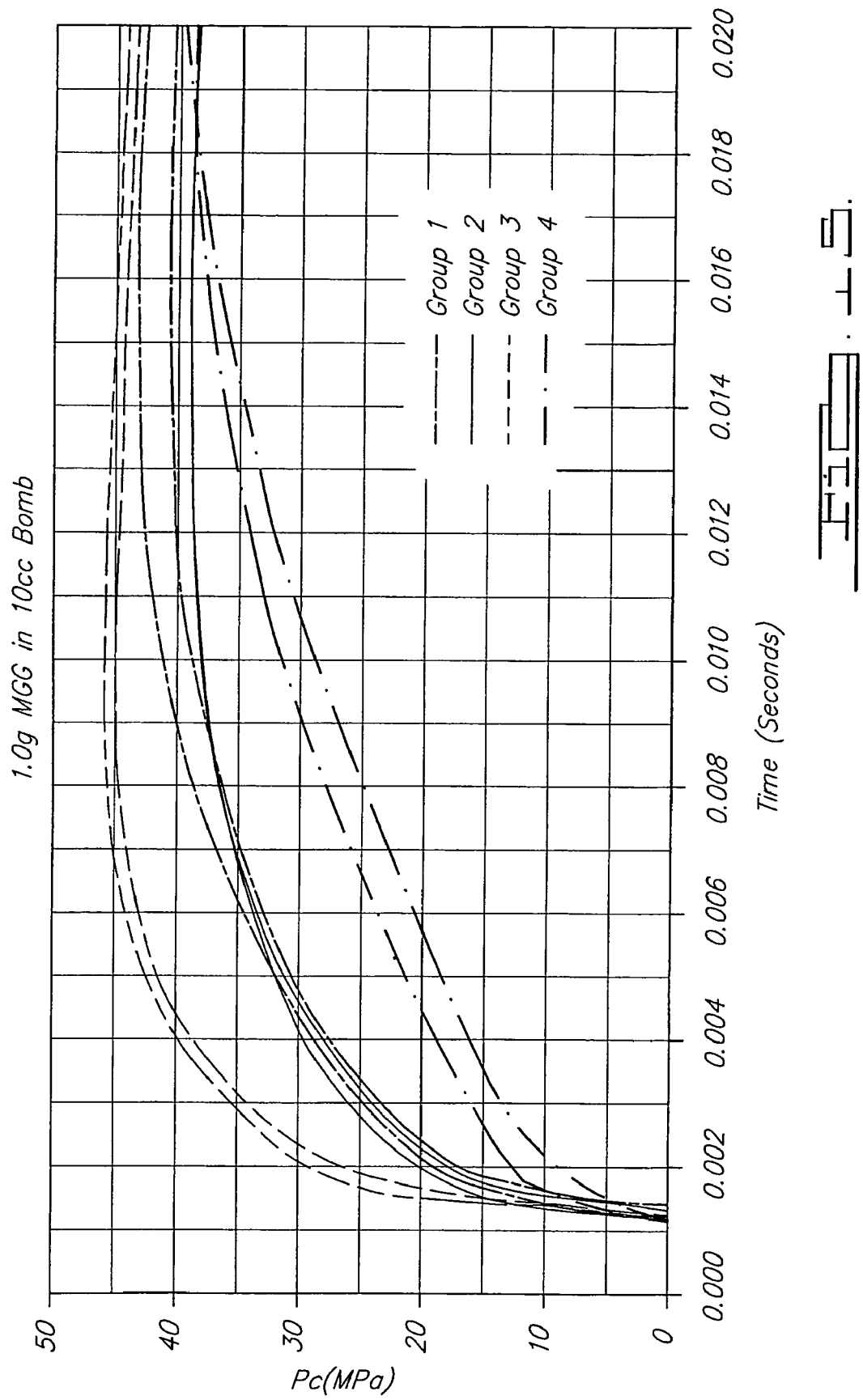
FIG. 5 is a cross-sectional side view of a second ignition cup in accordance with the present invention.

Referring to FIGS. 1 and 5, a second ignition cup 24 is positioned adjacent second end closure 16, and is nested within housing 12 for a portion of the housing length. Ignition cup 24 has a base portion 24a and a wall 24b extending from the base portion to abut second end closure 16 along second end closure shoulder 16a. Base portion 24a, wall 24b, and second end closure 16 define a cavity 24d for containing a pyrotechnic compound 28 therein. At least one ignition gas exit orifice 24c is formed in ignition cup 24 for release of ignition compound combustion products once ignition compound 28 is ignited. An annular recess is formed in base portion 24a and is dimensioned so that an end portion of an annular sleeve 36 (described below) having a predetermined inner diameter may be positioned within recess 54 to form an interference fit with base portion 24a. Ignition cup 24 may be stamped, extruded, die cast, or otherwise metal formed and may be made from carbon steel or stainless steel, for example.

In the embodiment shown in FIG. 1, a rupturable, fluid-tight seal 25 is positioned across ignition orifice 24c to fluidly isolate cavity 24d from a second combustion chamber 36a prior to activation of the gas generating system. Seal 25 is secured to either of opposite faces 24f and 24g of ignition cup base portion 24a and forms a fluid-tight barrier between cavity 24d and second combustion chamber 36a. Various disks, foils, films, tapes, etc. may be used to form the seal.

Referring again to FIGS. 1 and 4, a quantity of a pyrotechnic compound 26 is contained within cavity 22d. In the embodiment shown in FIGS. 1 and 4, pyrotechnic compound 26 is a known or suitable ignition or booster compound, whose combustion ignites another, main gas generant charge 38 positioned in combustion chamber 34a. In an alternative embodiment, pyrotechnic compound 26 in cavity 22d comprises the main gas generant charge for the gas generating system and is formed from a gas generant composition (for example, a smokeless gas generant composition) as described in greater detail below. This alternative embodiment may be used in applications in which a relatively small amount of inflation gas (and, therefore, a correspondingly smaller amount of gas generant) is needed. One or more autoignition tablets (not shown) may be placed in cavity 22d, allowing ignition of pyrotechnic compound 26 upon external heating in a manner well-known in the art.

Referring again to FIGS. 1 and 5, a quantity of a pyrotechnic compound 28 is contained within cavity 24d. In the embodiment shown in FIGS. 1 and 5, pyrotechnic compound 28 is a known or suitable ignition or booster compound, whose combustion ignites another, main gas generant charge 40 positioned in combustion chamber 36a. In an alternative embodiment, pyrotechnic compound 28 in cavity 24d comprises the main gas generant charge for the gas generating system and is formed from a gas generant composition (for example, a smokeless gas generant composition) as described in greater detail below. This alternative embodiment may be used in applications in which a relatively small amount of inflation gas (and, therefore, a correspondingly smaller amount of gas generant) is needed. One or more autoignition tablets (not shown) may be placed in cavity 24d, allowing ignition of pyrotechnic compound 28 upon external heating in a manner well-known in the art.

Referring again to FIGS. 1 and 2, a first igniter assembly 30 is positioned and secured within first end closure central orifice 14b so as to enable operative communication between cavity 22d containing ignition compound 26 and an igniter 30a incorporated into the igniter assembly, for igniting ignition compound 26 upon activation of the gas generating system.

Similarly, a second igniter assembly 32 (FIG. 3) is positioned and secured within second end closure central orifice 16b so as to enable operative communication between cavity 24d containing ignition compound 28 and an igniter 32a incorporated into the igniter assembly, for igniting ignition compound 28 upon activation of the gas generating system. Igniter assemblies 30 and 32 may be secured in respective central orifices 14b and 16b using any one of several known methods, for example, by welding, crimping, using an interference fit, or by adhesive application. Igniter assemblies suitable for the application described herein may be obtained from any of a variety of known sources, for example Primex Technologies, Inc. of Redmond, Wash. or Aerospace Propulsion Products by, of The Netherlands.

Referring to FIGS. 1 and 8, recess 22e in first ignition cup 22 (FIG. 4) and recess 44a in first baffle end plate 44 (FIG. 6, described below) are adapted to accommodate end portions of a first annular sleeve 34 therein. In the embodiment of the gas generating system shown in FIG. 1, first sleeve 34, in combination with first igniter cup 22 and first end plate 44 define a first combustion chamber 34a containing a main gas generant composition 38 (described in greater detail below.) First sleeve 34 is spaced apart from housing wall 12c to form a first annular gas flow passage 56 extending along first combustion chamber 34a. Upon activation of the gas generating system, first combustion chamber 34a fluidly communicates with cavity 22d by way of ignition cup orifice 22c.

Referring to FIGS. 1 and 9, recess 24e in second ignition cup 24 (FIG. 5) and recess 46a in second end plate 46 (FIG. 7, described below) are adapted to accommodate end portions of a second annular sleeve 36 therein. In the embodiment of the gas generating system shown in FIG. 1, second sleeve 36, in combination with second igniter cup 24 and second baffle end plate 46 define a second combustion chamber 36a containing a gas generant composition 40 (described in greater detail below.) Sleeve 36 is spaced apart from housing wall 12c to form a second annular gas flow passage 58 extending along second combustion chamber 36a. Upon activation of the gas generating system, second combustion chamber 36a fluidly communicates with cavity 24d by way of ignition cup orifice 24c. Sleeves 34 and 36 may be formed by extrusion or other suitable metal forming methods.

Referring again to FIG. 1, gas generant compositions 38 and 40 are positioned within combustion chambers 34a and 36a, respectively. Chambers 34a and 36a may contain the same or different gas generant compositions. In addition, chambers 34a and 36a may contain the same or different amounts of gas generant, and the chambers may be the same or different sizes.

In addition, "smokeless" gas generant compositions are applicable to gas generating systems according to the present invention, although the present invention is not limited to the use of smokeless gas generant compositions therein. As used herein, the term "smokeless" should be generally understood to mean such propellants as are capable of combustion yielding at least about 90% gaseous products based on a total product mass; and, as a corollary, no more than about 10% solid products based on a total product mass. It has been generally found that the use of gas generant compositions having the combustion characteristics described in cited patents helps obviate the need for the filters used in other gas generating system designs.

Gas generant compositions 38 and 40 positioned in combustion chambers 34a and 36a may be any known gas generant composition useful for airbag application and is exemplified by, but not limited to, compositions and processes described in U.S. Pat. Nos. 5,035,757, 5,872,329, 6,074,502, 6,287,400, 6,306,232 and 6,475,312, 6,210,505, and 6,620, 266, each incorporated by reference herein. Other suitable compositions are set forth in the U.S. patent application Ser. Nos. 10/407,300 and 60/369,775, incorporated by reference herein.

U.S. Pat. No. 5,037,757 discloses azide-free gas generants including tetrazole compounds such as aminotetrazole, tetrazole, bitetrazole and metal salts of these compounds, as well as triazole compounds such as 1,2,4-triazole-5-one or 3-nitro 1,2,4-triazole-5-one and metal salts of these compounds. Certain metal salts (alkaline earth metals) of these compounds can function, at least in part, as high temperature slag formers. For example, the calcium salt of tetrazole or bitetrazole forms, upon combustion, calcium oxide which would function as a high-temperature slag former. Magnesium, strontium, barium and possibly cerium salts would act in similar manner. In combination with a low-temperature slag former, a filterable slag would be formed. The alkali metal salts (lithium, sodium, potassium) could be considered, at least in part, as low-temperature slag formers since they could yield lower melting silicates or carbonates upon combustion.

Oxidizers generally supply all or most of the oxygen present in the system. In addition, however, they are the preferred method of including a high-temperature slag former into the reaction system. The alkaline earth and cerium nitrates are all oxidizers with high-temperature slag forming potential, although most of these salts are hygroscopic and are difficult to use effectively. Strontium and barium nitrates are easy to obtain in the anhydrous state and are excellent oxidizers. Alkali metal nitrates, chlorates and perchlorates are other useful oxidizers when combined with a high-temperature slag former.

Set in the above context, the pyrotechnic, slag forming gas generating mixture disclosed in U.S. Pat. No. 5,037,757 comprises at least one each of the following materials.

a. A fuel selected from the group of tetrazole compounds consisting of aminotetrazole, tetrazole, bitetrazole and metal salts of these compounds as well as triazole compounds and metal salts of triazole compounds.

b. An oxygen containing oxidizer compound selected from the group consisting of alkali metal, alkaline earth metal, lanthanide and ammonium nitrates and perchlorates or from the group consisting of alkali metal or alkaline earth metal chlorates or peroxides.

c. A high temperature slag forming material selected from the group consisting of alkaline earth metal or transition metal oxides, hydroxides, carbonates, oxalates, peroxides, nitrates, chlorates and perchlorates or from the group consisting of alkaline earth metal salts of tetrazoles, bitetrazoles and triazoles.

d. A low-temperature slag forming material selected from the group consisting of silicon dioxide, boric oxide and vanadium pentoxide or from the group consisting of alkali metal silicates, borates, carbonates, nitrates, perchlorates or chlorates or from the group consisting of alkali metal salts of tetrazoles, bitetrazoles and triazoles or from the group consisting of the various naturally occurring clays and talcs.

The fuel may comprise 5-aminotetrazole which is present in a concentration of about 22 to about 36% by weight, where the oxygen containing oxidizer compound and high-temperature slag former is strontium nitrate which is present in a concentration of about 38 to about 62% by weight, and said low-temperature slag former is silicon dioxide which is present in a concentration of about 2 to about 18% by weight.

Alternatively, the fuel and high-temperature slag forming material may comprise the strontium salt of 5-aminotetrazole which is present in a concentration of about 30 to about 50% by weight, where the oxygen containing oxidizer compound is potassium nitrate which is present in a concentration of about 40 to about 60% by weight, and the low-temperature slag former is talc which is present in a concentration of about 2 to about 10% by weight. The talc may be replaced by clay.

Another combination comprises the 5-aminotetrazole which is present in a combination of about 22 to about 36% by weight, where the oxygen containing oxidizer compound is sodium nitrate which is present in a concentration of about 30 to about 50% by weight, the high-temperature slag forming material is magnesium carbonate which is present in a concentration of about 8 to about 30% by weight, and the low-temperature slag former is silicon dioxide which is present in a concentration of about 2 to about 20% by weight. Magnesium carbonate may be replaced by magnesium hydroxide.

Yet another combination comprises the potassium salt of 5-aminotetrazole which is present in a concentration of about 2 to about 30% by weight which serves in part as a fuel and in part as a low-temperature slag former and wherein 5-aminotetraozle in a concentration of about 8 to about 40% by weight also serves as a fuel, and wherein clay in a concentration of about 2 to about 10% by weight serves in part as the low-temperature slag former and wherein strontium nitrate in a concentration of about 40 to about 66% by weight serves as both the oxygen containing oxidizer and high-temperature slag former.

U.S. Pat. No. 5,872,329 discloses nonazide gas generants for a vehicle passenger restraint system employing ammonium nitrate as an oxidizer and potassium nitrate as an ammonium nitrate phase stabilizer. The fuel, in combination with phase stabilized ammonium nitrate, is selected from the group consisting of amine salts of tetrazoles and triazoles having a cationic amine component and an anionic component. The anionic component comprises a tetrazole or triazole ring, and an R group substituted on the 5-position of the tetrazole ring, or two R groups substituted on the 3- and 5-positions of the triazole ring. The R group(s) is selected from hydrogen and any nitrogen-containing compounds such as amino, nitro, nitramino, tetrazolyl and triazolyl groups. The cationic amine component is selected from an amine group including ammonia, hydrazine, guanidine compounds such as guanidine, aminoguanidine, diaminoguanidine, triaminoguanidine, dicyandiamide, nitroguanidine, nitrogen substituted carbonyl compounds such as urea, carbohydrazide, oxamide, oxamic hydrazide, bis-(carbonamide) amine, azodicarbonamide, and hydrazodicarbonamide, and amino azoles such as 3-amino-1,2,4-triazole, 3-amino-5-nitro-1,2,4-triazole, 5-aminotetrazole and 5-nitraminotetrazole. Optional inert additives such as clay or silica may be used as a binder, slag former, coolant or processing aid. Optional ignition aids comprised of nonazide propellants may also be utilized in place of conventional ignition aids such as $BKNO_3$. The gas generants are prepared by dry blending and compaction of the comminuted ingredients.

Preferred high nitrogen nonazides employed as primary fuels in gas generant compositions include, in particular, amine salts of tetrazole and triazole selected from the group including monoguanidinium salt of 5,5'-Bis-1H-tetrazole (BHT.1GAD), diguanidinium salt of 5,5'-Bis-1H-tetrazole (BHT.2GAD), monoaminoguanidinium salt of 5,5'-Bis-1H-tetrazole (BHT.1AGAD), diaminoguanidinium salt of 5,5'-Bis-1H-tetrazole (BHT.2AGAD), monohydrazinium salt of 5,5'-Bis-1H-tetrazole (BHT.1HH), dihydrazinium salt of 5,5'-Bis-1H-tetrazole (BHT.2HH), monoammonium salt of 5,5'-bis-1H-tetrazole (BHT.1NH.sub.3), diammonium salt of 5,5'-bis-1H-tetrazole (BHT.2NH$_3$), mono-3-amino-1,2,4-triazolium salt of 5,5'-bis-1H-tetrazole (BHT.1ATAZ), di-3-amino-1,2,4-triazolium salt of 5,5'-bis-1H-tetrazole (BHT.2ATAZ), diguanidinium salt of 5,5'-Azobis-1H-tetrazole (ABHT-2GAD), and monoammonium salt of 5-Nitramino-1H-tetrazole (NAT-1NH$_3$). The nonazide fuel generally comprises 15-65%, and preferably comprises 20-55%, by weight of the total gas generant composition.

The foregoing amine salts of tetrazole or triazole are dry-mixed with phase stabilized ammonium nitrate. The oxidizer is generally employed in a concentration of about 35 to 85% by weight of the total gas generant composition. The ammonium nitrate is stabilized by potassium nitrate, as taught in co-owned U.S. Pat. No. 5,531,941, entitled, "Process For Preparing Azide-Free Gas Generant Composition", and granted on Jul. 2, 1996, incorporated herein by reference. The PSAN comprises 85-90% AN and 10-15% KN and is formed by any suitable means such as co-crystallization of AN and KN, so that the solid-solid phase changes occurring in pure ammonium nitrate (AN) between −40° C. and 107° C. are prevented. Although KN is preferably used to stabilize pure AN, one skilled in the art will readily appreciate that other stabilizing agents may be used in conjunction with AN.

If a slag former, binder, processing aid, or coolant is desired, inert components such as clay, diatomaceous earth, alumina, or silica are provided in a concentration of 0.1-10% of the gas generant composition, wherein toxic effluents generated upon combustion are minimized.

Optional ignition aids, used in conjunction with the present invention, are selected from nonazide gas generant compositions comprising a fuel selected from a group including triazole, tetrazolone, aminotetrazole, tetrazole, or bitetrazole, or others as described in U.S. Pat. No. 5,139,588 to Poole, the teachings of which are herein incorporated by reference. Conventional ignition aids such as $BKNO_3$ are not required because the tetrazole or triazole based fuel, when combined with phase stabilized ammonium nitrate, significantly improves ignitability of the propellant and also provides a sustained burn rate.

U.S. Pat. No. 6,074,502 discloses nonazide gas generant compositions including phase stabilized ammonium nitrate (PSAN), one or more primary nonazide high-nitrogen fuels, and one or more secondary nonazide high-nitrogen fuels selected from the group including azodicarbonamide (ADCA) and hydrazodicarbonamide (AH).

One or more primary nonazide high-nitrogen fuels are selected from a group including tetrazoles and bitetrazoles such as 5-nitrotetrazole and 5,5'-bitetrazole; triazoles and nitrotriazoles such as nitroaminotriazole and 3-nitro-1,2,4 triazole-5-one; nitrotetrazoles; and salts of tetrazoles and salts of triazoles.

More specifically, salts of tetrazoles include in particular, amine, amino, and amide nonmetal salts of tetrazole and triazole selected from the group including monoguanidinium salt of 5,5'-Bis-1H-tetrazole (BHT.1GAD), diguanidinium salt of 5,5'-Bis-1H-tetrazole (BHT.2GAD), monoaminoguanidinium salt of 5,5'-Bis-1H-tetrazole (BHT.1AGAD), diaminoguanidinium salt of 5,5'-Bis-1H-tetrazble (BHT.2AGAD), monohydrazinium salt of 5,5'-Bis-1H-tetrazole (BHT.1HH), dihydrazinium salt of 5,5'-Bis-1H-tetrazole (BHT.2HH), monoammonium salt of 5,5'-bis-1H-tetrazole ($BHT.1NH_3$), diammonium salt of 5,5'-bis-1H-tetrazole ($BHT.2NH_3$), mono-3-amino-1,2,4-triazolium salt of 5,5'-bis-1H-tetrazole (BHT.1ATAZ), di-3-amino-1,2,4-triazolium salt of 5,5'-bis-1H-tetrazole (BHT.2ATAZ), and diguanidinium salt of 5,5'-Azobis-1H-tetrazole (ABHT.2GAD).

Amine salts of triazoles include monoammonium salt of 3-nitro-1,2,4-triazole ($NTA.1NH_3$), monoguanidinium salt of 3-nitro-1,2,4-triazole (NTA.1GAD), diammonium salt of dinitrobitriazole ($DNBTR.2NH_3$), diguanidinium salt of dinitrobitriazole (DNBTR.2GAD), and monoammonium salt of 3,5-dinitro-1,2,4-triazole ($DNTR.1NH_3$).

A preferred gas generant composition results from the mixture of one or more primary nonazide high-nitrogen fuels comprising 5%-45%, and more preferably 9%-27% by weight of the gas generant composition; one or more secondary nonazide high-nitrogen fuels comprising 1%-35%, and more preferably 1%-15% by weight of the gas generant composition; and PSAN comprising 55%-85%, and more preferably 66%-78% by weight of the gas generant composition. Tetrazoles are more preferred than triazoles due to a higher nitrogen and lower carbon content thereby resulting in a higher burning rate and lower carbon monoxide. Salts of tetrazoles are even more preferred because of superior ignition stability. As taught by Onishi, U.S. Pat. No. 5,439,251, herein incorporated by reference, salts of tetrazoles are much less sensitive to friction and impact thereby enhancing process safety. Nonmetallic salts of bitetrazoles are more preferred than nonmetallic salts of tetrazoles due to superior thermal stability. As also taught by Onishi, nonmetallic salts of bitetrazoles have higher melting points and higher exothermal peak temperatures thereby resulting in greater thermal stability when combined with PSAN. The diammonium salt of bitetrazole is most preferred because it is produced in large quantities and readily available at a reasonable cost.

An optional burn rate modifier, from 0-10% by weight in the gas generant composition, is selected from a group including an alkali metal, an alkaline earth or a transition metal salt of tetrazoles or triazoles; an alkali metal or alkaline earth nitrate or nitrite; TAGN; dicyandiamide, and alkali and alkaline earth metal salts of dicyandiamide; alkali and alkaline earth borohydrides; or mixtures thereof. An optional combination slag former and coolant, in a range of 0 to 10% by weight, is selected from a group including clay, silica, glass, and alumina, or mixtures thereof. When combining the optional additives described, or others known to those skilled in the art, care should be taken to tailor the additions with respect to acceptable thermal stability, burn rates, and ballistic properties.

U.S. Pat. No. 6,287,400 discloses gas generant compositions containing 5-aminotetrazole nitrate (5-ATN) provided at 25-100% by weight of the gas generant, depending on the application. 5-ATN is characterized as an oxygen-rich fuel attributed to the oxygen in the nitrate group. The use of 5-ATN within a gas generant composition therefore requires little or no additional oxidizer, again depending on the application. 5-ATN is more preferably provided at 30-95% by weight and most preferably provided at 55-85% by weight of the gas generant composition.

In certain applications, the oxygen balance must be tailored to accommodate reduced levels of carbon monoxide (CO) and nitrogen oxides (NOx) as driven by original equipment manufacturer toxicity requirements. For example, the gas generated upon combustion of a gas generant within a vehicle occupant restraint system must minimize or eliminate production of these toxic gases. Therefore, when adding an oxidizer to 5-ATN, it is generally understood that an oxygen balance of about −4.0 to +4.0 is desirable when the gas generant is used in an airbag inflator. The preferred percentages of 5-ATN reflect this characteristic.

One or more oxidizers may be selected from the group including nonmetal, alkali metal, and alkaline earth metal nitrates, nitrites, perchlorates, chlorates, and chlorites for example. Other oxidizers well known in the art may also be used. These include alkali, alkaline earth, and transitional metal oxides, for example. Preferred oxidizers include phase stabilized ammonium nitrate (PSAN), ammonium nitrate, potassium nitrate, and strontium nitrate. The oxidizer(s) is provided at 5-70% by weight of the gas generant composition and more preferably at 20-45% by weight of the oxidizer.

Standard additives such as binders, slag formers, burn rate modifiers, and coolants may also be incorporated if desired. Inert components may be included and are selected from the group containing clay, silicon, silicates, diatomaceous earth, and oxides such as glass, silica, alumina, and titania. The silicates include but are not limited to silicates having layered structures such as talc and the aluminum silicates of clay and mica; aluminosilicate; borosilicates; and other silicates such as sodium silicate and potassium silicate. The inert component is present at about 0.1-20% by weight, more preferably at about 0.1-8%, and most preferably at 0.1-3%. A most preferred embodiment contains 73.12% 5-ATN and 26.88% PSAN10 (stabilized with 10% potassium nitrate).

U.S. Pat. No. 5,872,329 discloses nonazide gas generants including phase stabilized ammonium nitrate (PSAN), nitroguanidine (NQ), and one or more nonazide high-nitrogen fuels. One or more high-nitrogen fuels are selected from a group including tetrazoles such as 5-nitrotetrazole, 5,5'- bitetrazole, triazoles such as nitroaminotriazole, nitrotriazoles, nitrotetrazoles, salts of tetrazoles and triazoles, and 3-nitro-1,2,4 triazole-5-one.

More specifically, salts of tetrazoles include in particular, amine, amino, and amide salts of tetrazole and triazole selected from the group including monoguanidinium salt of 5,5'-Bis-1H-tetrazole (BHT.1GAD), diguanidinium salt of 5,5'-Bis-1H-tetrazole (BHT.2GAD), monoaminoguanidinium salt of 5,5'-Bis-1H-tetrazole (BHT.1AGAD), diaminoguanidinium salt of 5,5'-Bis-1H-tetrazole (BHT.2AGAD), monohydrazinium salt of 5,5'-Bis-1H-tetrazole (BHT.1HH), dihydrazinium salt of 5,5'-Bis-1H-tetrazole (BHT.2HH), monoammonium salt of 5,5'-bis-1H-tetrazole (BHT.1NH$_3$), diammonium salt of 5,5'-bis-1H-tetrazole (BHT.2NH$_3$), mono-3-amino-1,2,4-triazolium salt of 5,5'-bis-1H-tetrazole (BHT.1ATAZ), di-3-amino-1,2,4-triazolium salt of 5,5'-bis-1H-tetrazole (BHT.2ATAZ), and diguanidinium salt of 5,5'-Azobis-1H-tetrazole (ABHT.2GAD).

Amine salts of triazoles include monoammonium salt of 3-nitro-1,2,4-triazole (NTA.1NH$_3$), monoguanidinium salt of 3-nitro-1,2,4-triazole (NTA.1GAD), diammonium salt of dinitrobitriazole (DNBTR.2NH$_3$), diguanidinium salt of dinitrobitriazole (DNBTR.2GAD), and monoammonium salt of 3,5-dinitro-1,2,4-triazole (DNTR.1NH$_3$).

A preferred fuel(s) is selected from the group consisting of amine and other nonmetal salts of tetrazoles and triazoles having a nitrogen containing cationic component and a tetrazole and/or triazole anionic component. The anionic component comprises a tetrazole or triazole ring, and an R group substituted on the 5-position of the tetrazole ring, or two R groups substituted on the 3- and 5-positions of the triazole ring. The R group(s) is selected from hydrogen and any nitrogen-containing compounds such as amino, nitro, nitramino, tetrazolyl and triazolyl groups. The cationic component is formed from a member of a group including amines, aminos, and amides including ammonia, hydrazine, guanidine compounds such as guanidine, aminoguanidine, diaminoguanidine, triaminoguanidine, dicyandiamide, nitroguanidine, nitrogen substituted carbonyl compounds such as urea, carbohydrazide, oxamide, oxamic hydrazide, bis-(carbonamide) amine, azodicarbonamide, and hydrazodicarbonamide, and, amino azoles such as 3-amino-1,2,4-triazole, 3-amino-5-nitro-1,2,4-triazole, 5-aminotetrazole and 5-nitraminotetrazole. Optional inert additives such as clay, alumina, or silica may be used as a binder, slag former, coolant or processing aid. Optional ignition aids comprised of nonazide propellants may also be utilized in place of conventional ignition aids such as BKNO$_3$.

Certain disclosed gas generant compositions contain a hydrated or anhydrous mixture of nitroguanidine, at least one nonazide high-nitrogen fuels selected from the group consisting of guanidines, tetrazoles, triazoles, salts of tetrazole, and salts of triazole, and an oxidizer selected from the group consisting of phase stabilized ammonium nitrate and ammonium perchlorate. The nonazide fuels may be further selected from the group consisting of 1-, 3-, and 5-substituted nonmetal salts of triazoles, and 1- and 5-substituted nonmetal salts of tetrazoles wherein the salts consist of nonmetallic cationic and anionic components, and, the salts are substituted with hydrogen or a nitrogen-containing compound.

A preferred gas generant composition results from the mixture of gas generant constituents including nitroguanidine, comprising 1%-30% by weight of the gas generant composition, one or more amine salts of tetrazoles and/or triazoles, comprising 4%-40% by weight of the gas generant composition, and PSAN, comprising 40%-85% by weight of the gas generant composition. In the percentages given, an even more preferred embodiment results from the mixture of gas generant constituents consisting essentially of NQ, PSAN, and amine salt(s) of 5,5'-bis-1H-tetrazole. In the percentages given, a most preferred composition results from the mixture of gas generant constituents consisting essentially of NQ, PSAN, and diammonium salt of 5,5'-bis-1H-tetrazole (BHT.2NH$_3$). When combined, the fuel component consisting of NQ and one or more high nitrogen fuels as described herein, comprises 15%-60% by weight of the gas generant composition.

Other nonmetal inorganic oxidizers such as ammonium perchlorate, or oxidizers that produce minimal solids when combined and combusted with the fuels listed above, may also be used. The ratio of oxidizer to fuel is preferably adjusted so that the amount of oxygen allowed in the equilibrium exhaust gases is less than 3% by weight, and more preferably less than or equal to 2% by weight. The oxidizer comprises 40%-85% by weight of the gas generant composition.

An optional burn rate modifier, from 0-10% by weight in the gas generant composition, is selected from a group including an alkali metal, an alkaline earth or a transition metal salt of tetrazoles or triazoles; an alkali metal or alkaline earth nitrate or nitrite; TAGN; dicyandiamide, and alkali and alkaline earth metal salts of dicyandiamide; alkali and alkaline earth borohydrides; or mixtures thereof. An optional combination slag former and coolant, in a range of 0 to 10% by weight, is selected from a group including clay, silica, glass, and alumina, or mixtures thereof. When combining the optional additives described, or others known to those skilled in the art, care should be taken to tailor the additions with respect to acceptable thermal stability, burn rates, and ballistic properties.

U.S. Pat. No. 5,872,329 discloses gas generants including 5-aminotetrazole nitrate (5-ATN) provided at 25-100% by weight of the gas generant, depending on the application. 5-ATN is characterized as an oxygen-rich fuel attributed to the oxygen in the nitrate group. The use of 5-ATN within a gas generant composition therefore requires little or no additional oxidizer, again depending on the application. 5-ATN is more preferably provided at 30-95% by weight and most preferably provided at 55-85% by weight of the gas generant composition.

In certain applications, the oxygen balance must be tailored to accommodate reduced levels of carbon monoxide (CO) and nitrogen oxides (NOx) as driven by original equipment manufacturer toxicity requirements. For example, the gas generated upon combustion of a gas generant within a vehicle occupant restraint system must minimize or eliminate production of these toxic gases. Therefore, when adding an oxidizer to 5-ATN, it is generally understood that an oxygen balance of about −4.0 to +4.0 is desirable when the gas generant is used in an airbag inflator. The preferred percentages of 5-ATN reflect this characteristic.

One or more oxidizers may be selected from the group including nonmetal, alkali metal, and alkaline earth metal nitrates, nitrites, perchlorates, chlorates, and chlorites for example. Other oxidizers well known in the art may also be used. These include alkali, alkaline earth, and transitional metal oxides, for example. Preferred oxidizers include phase stabilized ammonium nitrate (PSAN), ammonium nitrate, potassium nitrate, and strontium nitrate. The oxidizer(s) is provided at 5-70% by weight of the gas generant composition and more preferably at 20-45% by weight of the oxidizer.

Standard additives such as binders, slag formers, burn rate modifiers, and coolants may also be incorporated if desired. Inert components may be included and are selected from the group containing clay, silicon, silicates, diatomaceous earth, and oxides such as glass, silica, alumina, and titania. The silicates include but are not limited to silicates having layered structures such as talc and the aluminum silicates of clay and mica; aluminosilicate; borosilicates; and other silicates such as sodium silicate and potassium silicate. The inert component is present at about 0.1-20% by weight, more preferably at about 0.1-8%, and most preferably at 0.1-3%. A most preferred embodiment contains 73.12% 5-ATN and 26.88% PSAN10 (ammonium nitrate stabilized with 10% potassium nitrate).

U.S. Pat. No. 6,210,505 discloses high nitrogen nonazides employed as primary fuels in gas generant compositions which include, in particular, ammonium, amine, amino, and amide nonmetal salts of tetrazole and triazole selected from the group including monoguanidinium salt of 5,5'-Bi-1H-tetrazole (BHT.1GAD), diguanidinium salt of 5,5'-Bi-1H-tetrazole (BHT.2GAD), monoaminoguanidinium salt of 5,5'-Bi-1H-tetrazole (BHT.1AGAD), diaminoguanidinium salt of 5,5'-Bi-1H-tetrazole (BHT.2AGAD), monohydrazinium salt of 5,5'-Bi-1H-tetrazole (BHT.1HH), dihydrazinium salt of 5,5'-Bi-1H-tetrazole (BHT.2HH), monoammonium salt of 5,5'-Bi-1H-tetrazole (BHT.1NH$_3$), diammonium salt of 5,5'-Bi-1H-tetrazole (BHT.2NH$_3$), mono-3-amino-1,2,4-triazolium salt of 5,5'-Bi-1H-tetrazole (BHT.1ATAZ), di-3-amino-1,2,4-triazolium salt of 5,5'-Bi-1H-tetrazole (BHT.2ATAZ), diguanidinium salt of 5,5'-Azobis-1H-tetrazole (ABHT.2GAD), and monoammonium salt of 5-Nitramino-1H-tetrazole (NAT-1NH$_3$). The primary fuel generally comprises about 13 to 38%, and more preferably about 23 to 28%, by weight of the gas generating composition.

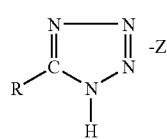

Formula I

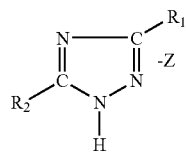

Formula II

A generic nonmetal salt of tetrazole as shown in Formula I includes a cationic component, Z, and an anionic component comprising a tetrazole ring and an R group substituted on the 5-position of the tetrazole ring. A generic nonmetal salt of triazole as shown in Formula II includes a cationic component, Z, and an anionic component comprising a triazole ring and two R groups substituted on the 3- and 5-positions of the triazole ring, wherein $R_1$ may or may not be structurally synonymous with $R_2$ An R component is selected from a group including hydrogen or any nitrogen-containing compound such as an amino, nitro, nitramino, or a tetrazolyl or triazolyl group from Formula I or II, respectively, substituted directly or via amine, diazo, or triazo groups. The compound Z forms a cation by displacing a hydrogen atom at the 1-position of either formula, and is selected from an amine group including ammonia, hydrazine; guanidine compounds such as guanidine, aminoguanidine, diaminoguanidine, triaminoguanidine, and nitroguanidine; amides including dicyandiamide, urea, carbohydrazide, oxamide, oxamic hydrazide, Bi-(carbonamide)amine, azodicarbonamide, and hydrazodicarbonamide; and substituted azoles including 3-amino-1,2,4-triazole, 3-amino-5-nitro-1,2,4-triazole, 5-aminotetrazole, 3-nitramino-1,2,4-triazole, and 5-nitraminotetrazole; and azines such as melamine.

The foregoing nonmetal salts of tetrazole or triazole are dry-mixed with phase stabilized ammonium nitrate (PSAN). PSAN is generally employed in a concentration of about 46 to 87%, and more preferably 56 to 77%, by weight of the total gas generant composition. The ammonium nitrate is stabilized by potassium nitrate as taught in co-owned U.S. Pat. No. 5,531,941, entitled, "Process For Preparing Azide-Free Gas Generant Composition", and granted on Jul. 2, 1996, incorporated herein by reference. The PSAN comprises 85-90% AN and 10-15% KN and is formed by any suitable means such as co-crystallization of AN and KN, so that the solid-solid phase changes occurring in pure ammonium nitrate (AN) between −40° C. and 107° C. are prevented. Although KN is preferably used to stabilize pure AN, one skilled in the art will readily appreciate that other stabilizing agents may be used in conjunction with AN.

The gas generants further contain a metallic oxidizer selected from alkali metal and alkaline earth metal nitrates and perchlorates. One of ordinary skill will readily appreciate that other oxidizers such as metallic oxides, nitrites, chlorates, peroxides, and hydroxides may also be used. The metallic oxidizer is present at about 0.1-25%, and more preferably 0.8-15%, by weight of the gas generating composition.

The gas generants yet further contain an inert component selected from the group containing silicates, silicon, diatomaceous earth, and oxides such as silica, alumina, and titania. The silicates include but are not limited to silicates having layered structures such as talc and the aluminum silicates of clay and mica; aluminosilicate; borosilicates; and other silicates such as sodium silicate and potassium silicate. The inert component is present at about 0.1-8%, and more preferably at about 0.1-3%, by weight of the gas generating composition.

A preferred embodiment contains 56-77% of PSAN, 23-28% of diammonium salt of 5,5'-Bi-1H-tetrazole (BHT.2NH3), 0.8-15% of strontium nitrate, and 0.1-3% of clay.

The combination of the metallic oxidizer and the inert component results in the formation of a mineral containing the metal from the metallic oxidizer. For example, the combination of clay, which is primarily aluminum silicate ($Al_2Si_4O_{10}$) and quartz ($SiO_2$) with strontium nitrate ($Sr(NO_3)_2$) results in a combustion product consisting primarily of strontium silicates ($SrSiO_4$ and $Sr_3SiO_5$). It is believed that this process aids in sustaining the gas generant combustion at all pressures and thus prevents inflator "no-fires".

Burn rates of gas generants containing a nonmetal salt as defined above, PSAN, an alkaline earth metal oxidizer, and an inert component are low (around 0.30 ips at 1000 psi), lower than the industry standard of 0.40 ips at 1000 psi. Thus, these compositions quite unexpectedly ignite and sustain combustion much more readily than other gas generants having burn rates below 0.40 ips at 1000 psi, and in some cases, perform better than gas generants having burn rates greater than 0.40 ips.

Optional ignition aids, used in conjunction with the present invention, are selected from nonazide fuels including triazoles, triazolone, aminotetrazoles, tetrazoles, or bitetrazoles, or others as described in U.S. Pat. No. 5,139,588 to Poole, the teachings of which are herein incorporated by reference. Conventional ignition aids such as BKNO$_3$ are no longer required because a gas generant containing a tetrazole or triazole based fuel, phase stabilized ammonium nitrate, a metallic oxidizer, and an inert component exhibits improved ignitability of the propellant and also provides a sustained burn rate with repeatable combustible performance.

The manner and order in which the components of the gas generating composition of the present invention are combined and compounded is not critical so long as a uniform mixture is obtained and the compounding is carried out under conditions which do not cause decomposition of the components employed. For example, the materials may be wet blended, or dry blended and attrited in a ball mill or Red Devil type paint shaker and then pelletized by compression molding. The materials may also be ground separately or together in a fluid energy mill, sweco vibroenergy mill or bantam micropulverizer and then blended or further blended in a v-blender prior to compaction.

When formulating a composition, the ratio of PSAN to fuel is adjusted such that the oxygen balance is between −4.0% and +1.0% $O_2$ by weight of composition as described above. More preferably, the ratio of PSAN to fuel is adjusted such that the composition oxygen balance is between −2.0% and 0.0% $O_2$ by weight of composition. It can be appreciated that the relative amount of PSAN and fuel will depend both on the additive used to form PSAN as well as the nature of the selected fuel.

In Tables 1 and 2 below, PSAN is phase-stabilized with 15% KN of the total oxidizer component in all cases except those marked by an asterisk. In that case, PSAN is phase-stabilized with 10% KN of the total oxidizer component.

In accordance with the present invention, these formulations will be both thermally and volumetrically stable over a temperature range of −40° C. to 110° C.; produce large volumes of non-toxic gases; produce minimal solid particulates; ignite readily and burn in a repeatable manner; contain no toxic, sensitive, or explosive starting materials; and, be non-toxic, insensitive, and non-explosive in final form.

TABLE 1

| EX | Composition by Weight Percent | Moles of Gas/ 100 g of Generant | Grams of Solids/ 100 g of Generant | Oxygen Balance by Weight Percent | Burn Rate at 1000 psi (in/sec) |
|---|---|---|---|---|---|
| 1 | 76.43% PSAN 23.57% BHT•2NH$_3$ | 4.00 | 5.34 | 0.0% | 0.48 |
| 2 | 75.40% PSAN 24.60% BHT•2NH$_3$ | 4.00 | 5.27 | −1.0% | 0.47 |
| 3 | 72.32% PSAN 27.68% BHT•2NH$_3$ | 4.00 | 5.05 | −4.0% | 0.54 |

TABLE 2

| EX | Composition in Weight Percent | Mol Gas/ 100 g of Generant | Grams of Solids/ 100 g of Generant | Oxygen Balance in Weight Percent |
|---|---|---|---|---|
| 4 | 73.06% PSAN* 26.94% BHT•2NH$_3$ | 4.10 | 3.40 | −4.0% |
| 5 | 76.17% PSAN* 23.83% BHT•2NH$_3$ | 4.10 | 3.55 | −1.0% |
| 6 | 78.25% PSAN* 21.75% BHT•2NH$_3$ | 4.10 | 3.65 | +1.0% |
| 7 | 73.08% PSAN 26.92% BHT•1GAD | 3.95 | 5.11 | −4.0% |
| 8 | 76.08% PSAN 23.92% BHT•1GAD | 3.95 | 5.32 | −1.0% |
| 9 | 78.08% PSAN 21.92% BHT•1GAD | 3.95 | 5.46 | +1.0% |
| 10 | 73.53% PSAN 26.47% ABHT•2GAD | 3.95 | 5.14 | −4.0% |
| 11 | 76.48% PSAN 23.52% ABHT•2GAD | 3.95 | 5.34 | −1.0% |
| 12 | 78.45% PSAN 21.55% ABHT•2GAD | 3.95 | 5.48 | +1.0% |
| 13 | 46.27% PSAN 53.73% NAT•1NH$_3$ | 3.94 | 3.23 | −4.0% |
| 14 | 52.26% PSAN 47.74% NAT•1NH$_3$ | 3.94 | 3.65 | −1.0% |
| 15 | 56.25% PSAN 43.75% NAT•1NH$_3$ | 3.95 | 3.93 | +1.0% |

U.S. Pat. No. 6,220,266 discloses improving the combustion and ballistic properties of a given nonazide gas generant composition, particularly within a gas generator of an airbag inflator or within a seatbelt pretensioner, by coating the gas generant composition with silicone. By coating the outside of the generant pellets or granules with a curable silicone or silicone gumstock, an easily ignitable formulation that sustains combustion is obtained. Exemplary inflators/gas generators include those described in co-owned U.S. Pat. Nos. 5,628,528, 5,622,380, 5,727,813, and 5,806,888 herein incorporated by reference. Exemplary pretensioners include those described in U.S. Pat. Nos. 5,397,075 and 5,899,399, herein incorporated by reference.

Figure 15:
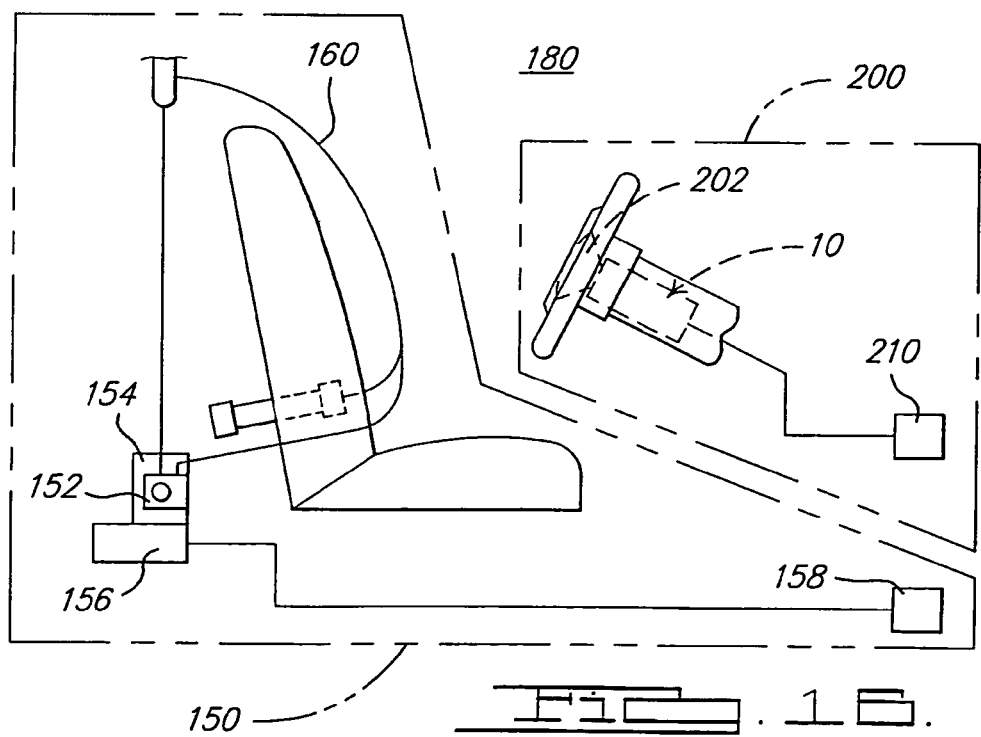
FIG. 15 graphically illustrates the preferred ballistic performance of silicon-coated gas generant compositions as compared to the same uncoated compositions containing silicone as a binder.

The nonazide gas generant compositions contain one or more fuels, at least one oxidizer, and if desired, other additives well known in the art. In general, compounds that function primarily as binders are not required given that the granules, pellets or tablets are pressure formed. Therefore, elastomeric binders (i.e. rubber or silicone, and the like) are not combined or mixed into the gas generant composition, particularly in view of the ballistic performance of gas generant compositions containing such binders. See FIG. 15. Other binders not having an elastomeric nature may be used if desired, however.

Stated another way, the gas generant compositions do not include azides as fuels, nor do they contain any azido or azide groups within any constituent combined therein. The gas generant compositions contemplated herein contain a nitrogen-containing fuel selected from the group including tetrazoles, bitetrazoles, triazoles, triazines, guanidines, nitroguanidines, metal and nonmetal salts and derivatives of the foregoing fuels, and mixtures thereof; and, an oxidizer selected from the group including nonmetal or metal (alkali, alkaline earth, and transitional metals) nitrates, nitrites, chlorates, chlorites, perchlorates, oxides, and mixtures thereof. Exemplary fuels include nitroguanidine, guanidine nitrate, aminoguanidine nitrate, 1H-tetrazole, 5-aminotetrazole, 5-nitrotetrazole, 5,5'-bitetrazole, diguanidinium-5,5'-azotetrazolate, nitroaminotriazole, and melamine nitrate; and metal and nonmetal salts of the foregoing fuels.

U.S. Pat. Nos. 5,035,757, 5,139,588, 5,531,941, 5,756,929, 5,872,329, 6,077,371, and 6,074,502, herein incorporated by reference, exemplify, but do not limit, suitable gas generant compositions. In general, any gas generant composition (within any gas generator or any pretensioner, for example) may be coated with silicone, thereby resulting in improved ignitability and improved combustion and ballistic properties. The burn rate is vigorously sustained throughout combustion of a gas generant composition coated with silicone.

Exemplary nitrated fuels employed in "smokeless" gas generant compositions include nitrourea, 5-aminotetrazole nitrate (5ATN), dinitrodiaminotriazole, urea nitrate, azodicarbonamide nitrate, hydrazodicarbonamide nitrate, semicarbazide nitrate, and carbohydrazide nitrate, biuret nitrate, 3,5-diamino-1,2,4-triazole nitrate, dicyandiamide nitrate, and 3-amino-1,2,4-triazole nitrate. Certain fuels may be generically described as containing a nitrated base fuel such that the end compound will be the base fuel plus $HNO_3$. For example, urea nitrate is $H_2NCONH_2HNO_3$. It is conceivable that some of the fuels may be dinitrates although most will be mononitrates.

One or more "smokeless" fuels may also be selected from the group including amine salts of tetrazole and triazole including monoguanidinium salt of 5,5'-Bis-1H-tetrazole (BHT.1 GAD), bis-(1(2)H-tetrazole-5-yl)-amine (BTA.2$NH_3$), diguanidinium salt of 5,5'-Bis-1H-tetrazole (BHT.2GAD), monoaminoguanidinium salt of 5,5'-Bis-1H-tetrazole (BHT.1AGAD), iaminoguanidinium salt of 5,5'-Bis-1H-tetrazole (BHT.2AGAD), monohydrazinium salt of 5,5'-Bis-1H-tetrazole (BHT.1HH), dihydrazinium salt of 5,5'-Bis-1H-tetrazole (BHT.2HH), monoammonium salt of 5,5'-bis-1H-tetrazole (BHT.1$NH_3$), diammonium salt of 5,5'-bis-1H-tetrazole (BHT.2$NH_3$), mono-3-amino-1,2,4-triazolium salt of 5,5'-bis-1H-tetrazole (BHT.1ATAZ), di-3-amino-1,2,4-triazolium salt of 5,5'-bis-1H-tetrazole (BHT.2ATAZ), 5,5'-Azobis-1H-tetrazole (ABHT.2GAD), and monoammonium salt of 5-Nitramino-1H-tetrazole (NAT.1$NH_3$). Co-owned U.S. Pat. Nos. 5,872,329, 5,501,823, 5,783,773, and 5,545,272, each incorporated by reference herein, further elaborate on other "smokeless" gas generants and the manufacture thereof. Other "smokeless" gas generant compositions known in the art and as defined herein are also contemplated.

The gas generant compositions of the present invention further contain one or more inorganic oxidizers selected from the group of nonmetal, alkali metal, and alkaline earth metal nitrates and nitrites for example. Other oxidizers well known in the art may also be used. These include oxides or coordination complexes, for example. Preferred oxidizers include phase stabilized ammonium nitrate, ammonium nitrate, potassium nitrate, and strontium nitrate.

The gas generant composition, absent the silicone coating, contains 15-95% by weight of fuel and 5-85% by weight of oxidizer. The gas generant composition more preferably contains 20-85% by weight of fuel, and 15-80% by weight of oxidizer (not including the silicone coating). The gas generant constituents are homogeneously dry or wet blended and then formed into granules (800 μm to 12 mm, and more preferably 0.1 mm to 3 mm, in rough diameter), pellets, tablets, or other desired shapes by well known methods such as extrusion or pressure forming methods. The gas generant composition is then physically coated with 1-50%, and more preferable 3-20%, by weight (gas generant and the silicone) of a silicone gumstock or curable silicone polymer. Gas generant granules, tablets, pellets, or other desired shapes are formed and then added with an effective amount of silicone to a tumble blender and blended, preferably for at least two hours.

The term "silicone" as used herein will be understood in its generic sense. Hawley describes silicone (organosiloxane) as any of a large group of siloxane polymers based on a structure consisting of alternate silicon and oxygen atoms with various organic radicals attached to the silicon:

Formula I:

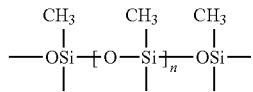

Silicone Example

Or, silicone can be more generically represented as shown in Formula 2:

Formula 2:

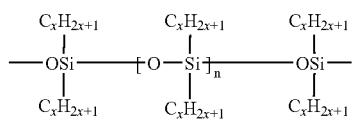

Silicone Example

Note, "n" in the Formulas indicates a multiple of the polymeric group or portion of the molecule given within the brackets, to include the organic groups attached to the silicon.

Exemplary silicones include those disclosed in U.S. Pat. Nos. 5,589,662, 5,610,444, and 5,700,532, and, in Technology of Polymer Compounds and Energetic Materials, Fraunhofer-Institut fur Chemische Technologie (ICT), 1990, each reference and document herein incorporated by reference.

Standard slag formers and coolants may also be incorporated if desired. Binders are not generally utilized because the gas generant constituents described herein are homogeneously blended and then preferably compacted or formed into granules or other shapes through pressure or other known physical methods. If binders are used, however, elastomeric, rubber, or silicone binders are not combined in the present compositions given the poor ballistic performance shown in FIG. 15.

Other "smokeless" gas generant compositions containing 5-ATN, or any other nitrated base fuel, are also contemplated. The base fuels include, but are not limited to, nitrourea, 5-aminotetrazole, diaminotriazole, urea, azodicarbonamide, hydrazodicarbonamide, semicarbazide, carbohydrazide, biuret, 3,5-diamino-1,2,4-triazole, dicyandiamide, and 3-amino-1,2,4-triazole. Each of these base fuels may be nitrated and combined with one or more oxidizers. Thus, methods of forming gas generant compositions containing 5ATN and one or more oxidizers, as described below but not thereby limited, exemplify the manufacture of gas generant compositions containing any nitrated base fuel and one or more oxidizers.

The constituents of the nitrated gas generant compositions may all be obtained from suppliers well known in the art. In general, the base fuel (in this case 5AT) and any oxidizers are added to excess concentrated nitric acid and stirred until a damp paste forms. This paste is then formed into granules by either extrusion or forcing the material through a screen. The wet granules are then dried.

The nitric acid can be the standard reagent grade (15.9M, ~70 wt. % $HNO_3$) or can be less concentrated as long as enough nitric acid is present to form the mononitrate salt of 5AT. The nitric acid should be chilled to 0-20° C. before adding the 5AT and oxidizers to ensure that the 5AT does not decompose in the concentrated slurry. When mixing the 5AT and oxidizers in the nitric acid medium, the precise mixing equipment used is not important—it is simply necessary to thoroughly mix all the components and evaporate the excess nitric acid. As with any process using acids, the materials of construction must be properly selected to prevent corrosion. In addition, sufficient ventilation and treatment of the acid vapor is required for added safety.

After forming a wet paste as described above, several methods can be used to form granules. The paste can be placed in a screw-feed extruder with holes of desired diameter and then chopped into desired lengths. An oscillating granulator may also be used to form granules of desired size. The material should be kept wet through all the processing steps to minimize safety problems. The final granules can be dried in ambient pressure or under vacuum. It is most preferred to dry the material at about 30° C. under a-12 psig vacuum.

Other suitable compositions are set forth in the U.S. patent application Ser. Nos. 10/407,300 and 60/369,775, incorporated herein by reference. Use of a smokeless gas generant composition allows the gas generating system to operate without the need for a filter to remove particulate materials from the inflation gas. It should be appreciated, however, that a filter might be disposed within or external to the gas generating system described herein if desired, for example, in applications wherein a non-smokeless gas generant material is used.

Referring again to FIG. 1, a baffle system, generally designated 42, is provided for cooling and removing slag from combustion products generated by combustion of gas generant composition 38 in first combustion chamber 34*a* and gas generant composition 40 in second combustion chamber 36*a*. As used here, the term "baffle" refers to a device that regulates the flow of a fluid.

In the embodiment shown in FIG. 1, baffle system 42 is positioned adjacent both the first and second combustion chambers so as to enable fluid communication with both first combustion chamber 34*a* and second combustion chamber 36*a* upon activation of the gas generating system. As seen in FIGS. 1, 6, 7, and 10, in one embodiment baffle system 42 comprises a first end plate 44, a second end plate 46, and at least one baffle element 48 positioned and secured between first and second end plates 44, 46 for channeling gases flowing through baffle system 42 from first and second combustion chambers 34*a* and 36*a*. In the embodiment shown in FIG. 1, first combustion chamber 34*a* is positioned on an opposite side of baffle system 42 from second combustion chamber 36*a*. However, the combustion chambers need not be positioned diametrically opposite each other. In addition, more than two combustion chambers may be operatively coupled to baffle system 42.

Referring to FIGS. 1 and 6, a first perforate end plate 44 is press fit or otherwise secured within housing 12. An annular recess 44*a* is formed on a face of end plate 44 along a periphery of the plate. Recess 44*a* is dimensioned so that an end portion of annular sleeve 34 (described above) having a predetermined inner diameter may be positioned within recess 44*a* to form an interference fit with end plate 44.

First end plate 44 also has at least one annular slot 44*b* (and preferably a plurality of annular slots) formed therein for positioning and securing one or more corresponding annular baffle elements 48 within baffle system 42.

At least one orifice 44*b* is provided in end plate 44 to enable fluid communication between gas generant combustion chamber 34*a* and an interior of baffle system 42. In the embodiment shown in FIGS. 1 and 6, a plurality of orifices 44*b* is formed in end plate 44. End plate 44 is made from a metal or metal alloy and may be a cast, stamped, drawn, extruded, or otherwise metal-formed and finish-machined as necessary.

A rupturable, fluid-tight seal 45 may be positioned across orifices 44*c* to fluidly isolate baffle system 42 from first combustion chamber 34*a* prior to activation of the gas generating system. The seal is secured to a face of end plate 44 and forms a fluid-tight barrier between baffle system 42 and combustion chamber 34*a*. Various disks, foils, films, tapes, etc. may be used to form seal 45.

Referring to FIGS. 1 and 7, a second perforate end plate 46 is press fit or otherwise secured within housing 12. An annular recess 46*a* is formed on a face of end plate 46 along a periphery of the plate. Recess 46*a* is dimensioned so that an end portion of annular sleeve 36 (described above) having a predetermined inner diameter may be positioned within recess 46*a* to form an interference fit with end plate 46.

End plate 46 also has at least one annular slot (and preferably a plurality of annular slots) formed therein for positioning and securing a plurality of corresponding annular baffle elements 48 within baffle system 42.

At least one orifice 46*b* is provided in end plate 46 to enable fluid communication between gas generant combustion chamber 36*a* and an interior of baffle system 42. In the embodiment shown in FIGS. 1 and 7, a plurality of orifices 46*b* is formed in end plate 46. End plate 46 is made from a metal or metal alloy and may be a cast, stamped, drawn, extruded, or otherwise metal-formed and finish-machined as necessary.

In the embodiment shown in FIG. 1, a rupturable, fluid-tight seal 47 may be positioned across orifices 46*b* to fluidly isolate baffle system 42 from combustion chamber 36*a* prior to activation of the gas generating system. The seal is secured to a face of end plate 46 and forms a fluid-tight barrier between baffle system 42 and combustion chamber 36*a*. Various dish, foils, films, tapes, etc. may be used to form seal 47.

Referring to FIGS. 1 and 10, at least a first baffle element 48*a* is provided for channeling gases flowing through baffle system 42 from first and second combustion chambers 34*a* and 36*a*, and for providing a tortuous flow path for the gases. In the embodiment shown in FIGS. 1 and 10, first baffle element 48*a* is in the form of a relatively thin plate.

First baffle plate 48*a* defines a chamber 60 adapted for receiving therein (through end plate openings 44*b*) a gas from first combustion chamber 34*a* and for receiving therein (through openings 46*b*) a gas from second combustion chamber 36*a* upon activation of the gas generating system.

First baffle plate 48*a* also has at least one opening 61 therealong for enabling fluid communication between chamber 60 and an exterior of the chamber. In the embodiment shown in FIG. 10, multiple orifices 61 are provided and are arranged to form a first baffle member orifice configuration, generally designated 61*a*. In this embodiment, openings 12*d* formed in housing wall 12*c* are is spaced apart from orifice configuration 61*a* so as to provide a tortuous path for flow of a gas between chamber entrance openings 44*b* and openings 12*d* in housing wall 12*c*.

The embodiment shown in FIG. 13 is identical to the embodiment shown in FIG. 1 except for the inclusion of additional baffle plates 48b and 48c. The embodiment shown in FIG. 13 includes a first baffle plate 48a, a second baffle plate 48b, and a third baffle plate 48c. Any desired number of baffle plates may be incorporated into baffle system 42, depending on the requirements of the baffle system.

In FIGS. 1 and 11, second baffle plate 48b is positioned interior of housing wall 12c and exterior of first baffle plate 48a so as to define a first fluid flow passage 70 extending between second baffle plate 48b and first baffle plate 48a. Third baffle plate 48c (FIG. 12) is positioned interior of housing wall 12c and exterior of second baffle plate 48b so as to define a second fluid flow passage 72 extending between second baffle plate 48b and third baffle plate 48c. Second baffle plate 48b has at least one opening 62 formed therealong for enabling fluid communication between first fluid flow passage 70 and second fluid flow passage 72. In the embodiment shown in FIG. 11, multiple orifices 62 are provided and are arranged to form a second baffle member orifice configuration, generally designated 62a. Third baffle plate 48c (FIG. 12) has at least one opening 63 formed therealong for enabling fluid communication between second fluid flow passage 72 and housing wall 12c. In the embodiment shown in FIG. 12, multiple orifices 63 are provided and are arranged to form a third baffle member orifice configuration, generally designated 63a.

In the embodiment shown in FIG. 13, openings 12d in housing 12 are spaced apart from third baffle member orifice configuration 63a (FIG. 12) and third baffle member orifice configuration 63a is spaced apart from second baffle member orifice configuration 62a (FIG. 11) so as to provide a tortuous path for flow of a fluid between at least one of baffle plate chamber entrances 44b, 46b and housing wall openings 12d.

In the embodiment shown in FIG. 13, baffle plates 48 are generally cylindrical. However, one or more of the baffle plates may have an alternative cross-sectional shape, if so required by a particular application. In the embodiment shown in FIG. 13, baffle plates 48 are positioned coaxially within housing. However, baffle plates 48 need not necessarily be positioned coaxially. Baffle plates 48 may be formed using any of a variety of known methods, such as extrusion or roll-forming. Orifice patterns 61a, 62a, and 63a in baffle plates 48 may be formed by punching or piercing.

Referring to FIG. 1, a fluid flow passage 56 may be formed interior of housing wall 12c and extending along at least a portion of first combustion chamber 34a. Fluid flow passage 56 is in fluid communication with baffle system 42 and with an exterior of the housing via housing openings 12d.

Referring again to FIG. 1, an additional fluid flow passage 58 may be formed interior of housing wall 12c and extending along at least a portion of second combustion chamber 36a. Fluid flow passage 58 is in fluid communication with baffle system 42 and with an exterior of the housing via housing openings 12d.

Operation of the gas generating system will now be discussed with reference to the Figures. Upon receipt of a signal from a crash sensor, an electrical activation signal is sent to one (or both) of igniters 30a and 32a. Either of igniters 30a and 32a may be activated alone. Alternatively, both of igniters 30a and 32a may be activated separately, in sequence, or simultaneously. Combustion products from igniters 30a and 32a expand into associated cavities 22d and 24d, igniting associated booster compounds 26 and 28 positioned in the cavities. Products from the combustion of booster compounds 26 and 28 proceed out of cavities 22d and 24d through associated ignition cup orifices 22c and 24c, igniting gas generants 38 and 40 positioned in associated combustion chambers 34a and 36a.

Products form combustion of gas generants 38 and 40 proceed through associated baffle end plate orifices 44b and 46b into chamber 60 of baffle system 42. From there, the gases exit through first baffle orifice configuration 61a formed in first baffle element 48a, proceeding through second baffle orifice configuration 62a formed in second baffle element 48b, then through third baffle orifice configuration 63a formed in third baffle element 48c. The gases then exit housing 12 through housing openings 12d. Thus, as may be seen in FIG. 13, gases produced in combustion chambers 34a and/or 36a flow alternately along baffle plates 48, during which the gases are cooled and slag is removed from the gases.

In alternative embodiments (not shown), housing openings 12d are positioned along fluid flow passage 56 and/or along fluid flow passage 58, rather than along the portion of housing 12 occupied by baffle system 42. In these embodiments, the total length of flow of the fluid through the gas generating system is increased by directing the fluid through passages 56 and/or 58 after exiting the baffle system, thereby providing additional cooling and slag removal if needed.

It is believed that the degree of cooling of the gas in the baffle system is largely dependent upon the total surface area of the relatively lower-temperature baffle elements over which the gas flows when transiting the baffle system. It is also believed that the pressure drop in the gas as it transits the baffle system is largely dependent upon the size and number of orifices through which the gas flows in the baffle system, and also on the spacing between adjacent baffles. Thus, the physical characteristics of baffle system 42 may be varied to produce a gas exiting the gas generating system with desired properties (for example, temperature or pressure.)

Referring to FIGS. 1-14, in one example, a gas having a pressure within a predetermined pressure range and a temperature within a predetermined temperature range may be produced. In a first step, a total length of a flow path of a gas along a given surface area of a predetermined baffle element material necessary to cool a gas to from a temperature in at least one of combustion chambers 34a and 36a to a temperature within a predetermined temperature range is estimated. A baffle system is then configured having a total length of internal flow path for the gas substantially equal to the estimated length of gas flow path necessary to cool the gas to within the desired temperature range. In one embodiment, as described above, a suitable sequence of baffle elements is formed from the baffle element material. A first baffle element 48a of the sequence of baffle elements defines a chamber 60 adapted for receiving therein a gas from one or more of combustion chambers 34a and 36a upon activation of the gas generating system. Each additional baffle element 48b, 48c in the sequence of baffle elements is spaced outwardly apart from a preceding baffle element in the sequence.

An overall baffle system orifice configuration (comprising orifice configurations 61a, 62a, and 63a formed in individual baffle elements of the baffle system) is incorporated into the baffle system along the internal flow path for the gas, to enable fluid communication between the various elements and flow passages of the baffle system. In one example, when it is desired to cool a gas emanating from first combustion chamber 34a, an orifice configuration 61a is provided in the first baffle element 48a for enabling fluid communication between chamber 60 and second baffle element 48b spaced outwardly apart from the first baffle element. First baffle element orifice configuration 61a is spaced apart a first predetermined distance L1 from an entrance 44b to the first baffle element chamber 60 from first combustion chamber 34*a*. In addition, orifice configurations 62*a* and 63*a* are provided in each additional baffle elements 48*b* and 48*c* outside the first baffle element. Orifice configuration 62*a* in baffle plate 48*b* enables fluid communication between first baffle plate 48*a* and an exterior of additional, second baffle plate 48*b*. Orifice configuration 63*a* in baffle plate 48*c* enables fluid communication between second baffle plate 48*b* and an exterior of third baffle plate 48*c*. The orifice configuration in each additional baffle element is spaced apart an additional predetermined distance from the orifice configuration in the preceding baffle element. Thus, orifice configuration 62*a* in baffle plate 48*b* is spaced apart a predetermined distance L2 from orifice configuration 61*a* in baffle plate 48*a*. Also, orifice configuration 63*a* in baffle plate 48*c* is spaced apart a predetermined distance L3 from orifice configuration 62*a* in baffle plate 48*b*. The baffle elements and their respective orifice patterns are structured such that a sum of the first predetermined distance L1 and the additional predetermined distances L2 and L3 are approximately equal to the estimated total length of a flow path of a gas necessary to cool the gas to a temperature within the predetermined temperature range.

The overall baffle system orifice configuration may also be adapted for modifying the pressure of a gas transiting the baffle system, to provide a gas having a pressure within a predetermined pressure range.

In one example, an orifice configuration in at least one of baffle elements 48 is varied such that the pressure of a gas flowing out of the baffle system through orifice configuration 63*a* in last baffle element 48*c* is at a pressure within the predetermined pressure range. The orifice configuration in at least one of baffle elements 48 may be varied, for example, by varying the sizes of the orifices in the baffle element or elements. The orifice configuration in at least one of the baffle elements may also be varied by varying the number of orifices in the baffle element or elements. In another example, the spacing between adjacent baffle plates 48*a*, 48*b*, 48*c* is varied to correspondingly vary the pressure of a gas flowing through orifice configuration 63*a* in last baffle element 48*c* such that the outflow pressure is at a pressure within the predetermined pressure range. When baffle plate arrangement having appropriate orifice configurations and/or spacings has been achieved, the baffle system is positioned within the housing so as to enable fluid communication with the first and second combustion chamber upon activation of the gas generating system, as previously described. As described above, determination of the baffle element dimensions and orifice configurations suitable for a particular application may be an iterative process.

In addition, the baffle system orifice configurations may be varied to control a flow rate of gas exiting the gas generating system. For example, reducing the sizes and number of internal orifices in baffle system 42 acts to restrict the flow of gases through the baffle system, thereby lengthening time period over which gases are dispensed from housing 12.

Increasing the number of nested baffle elements increases the number of flow passages traversed by the gases flowing from first baffle chamber 60 to housing openings 12*d*. Thus, the baffle surface area along which the gases flow prior to exiting the gas generating system is increased. It is believed that this results in an increase in the heat transferred from the gases to the baffle system and correspondingly reducing the temperature of the gases exiting the housing. Maximizing the baffle surface area also provides as large an area as possible for the capture of particulates from the combustion products.

Increasing the number of fluid flow passages also increases the pressure drop experienced by the inflation gases between chamber 60 and housing openings 12*d*. To a certain extent, the pressure drop caused by increasing the number of baffles may be compensated for by increasing the sizes and/or number of gas flow openings formed in baffle plates 48, to aid in reducing resistance to gas flow through the baffle system. Also, the pressure drop may be reduced by making the spacing between adjacent baffles as large as possible.

Alternatively, characteristics of the baffle system may be controlled such that the pressure of the inflation gas exiting housing 12 is within a predetermined pressure range. Minimizing the number of baffle elements in the baffle system will aid in minimizing the pressure drop in the gas due to passage through the baffle system. However, minimizing the number of baffle elements also reduces the ability of the baffle system to cool the gases.

It may be seen that by suitable controlling the physical parameters of the baffle system (for example, the number of baffle elements, the lengths of the baffle elements, and the sizes and number of gas flow openings in the baffle elements), gases having a wide variety of desired characteristics (for example, predetermined pressure, temperature, dispersal time from the gas generating system, etc.) may be obtained.

The gas generating system described herein provides several advantages over known designs. The properties of the gases generated may be varied according to design requirements by varying the number and arrangement of baffle elements and the number and configuration of orifices within the baffle system. In addition, the use of interference fits and other means for securing together the components of the baffle system and gas generating system obviate the need for welds in assembly of the gas generating system.

In a particular application, the gas generating system described above is incorporated into an airbag module of a vehicle occupant protection system. Referring to FIG. 16, any embodiment of the gas generator described herein may be incorporated into an airbag system 200. Airbag system 200 includes at least one airbag 202 and a gas generating system 10 as described herein coupled to the airbag so as to enable fluid communication with an interior of the airbag. Airbag system 200 may also be in communication with a known crash event sensor 210 that is in operative communication with a known crash sensor algorithm (not shown) which signals actuation of airbag system 200 via, for example, activation of igniter 68 (not shown in FIG. 16) in the event of a collision.

Referring again to FIG. 16, an embodiment of the gas generator or an airbag system including an embodiment of the gas generator may be incorporated into a broader, more comprehensive vehicle occupant restraint system 180 including additional elements such as a safety belt assembly. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 100 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Safety belt assembly 150 may be in communication with a known crash event sensor 158 (for example, an inertia sensor or an accelerometer) that is in operative communication with a known crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be appreciated that the various constituents described above are formed in known manners. For example, the baffles and various chambers may be molded stamped or otherwise metal formed from carbon steel, aluminum, metallic alloys, or polymeric equivalents.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

The invention claimed is:

1. A gas generating system comprising:
   a first combustion chamber containing a first quantity of gas generant material;
   a second combustion chamber containing a second quantity of gas generant material; and
   a baffle system positioned adjacent both the first and second combustion chambers so as to enable fluid communication with the first combustion chamber and the second combustion chamber upon activation of the gas generating system,
   the gas generating system being configured such that combustion of one of the first quantity of gas generant material and the second quantity of gas generant material may be initiated without initiating combustion of the other one of the first quantity of gas generant material and a second quantity of gas generant material.

2. The gas generating system of claim 1 wherein the baffle system is adapted for providing a tortuous flow path for a fluid flowing through the baffle system.

3. The gas generating system of claim 1 wherein the first combustion chamber is positioned on an opposite side of the baffle system from the second combustion chamber.

4. The gas generating system of claim 1 further comprising a smokeless gas generant composition positioned in at least one of the first combustion chamber and the second combustion chamber.

5. A vehicle occupant protection system comprising an airbag system including an airbag and a gas generating system in accordance with claim 1 operatively coupled to the airbag so as to enable fluid communication with the airbag upon activation of the airbag system.

6. A gas generating system comprising:
   a housing having an outer wall and at least one opening formed therein to enable fluid communication between an interior of the housing and an exterior of the housing
   a first combustion chamber;
   a second combustion chamber; and
   a baffle system positioned adjacent both the first and second combustion chambers so as to enable fluid communication with the first combustion chamber and the second combustion chamber upon activation of the gas generating system,
   the baffle system including a baffle plate defining a chamber adapted for receiving therein at least one of a fluid from the first combustion chamber and a fluid from the second combustion chamber upon activation of the gas generating system, the baffle plate having at least one opening therealong for enabling fluid communication between the chamber and an exterior of the chamber,
   wherein the at least one housing wall opening is spaced apart from the at least one baffle plate opening so as to provide a tortuous path for flow of a fluid between the at least one baffle plate opening and the at least one housing wall opening.

7. The gas generating system of claim 6 wherein the baffle system further comprises at least a second baffle plate and a third baffle plate, the second baffle plate being positioned exterior of the baffle plate so as to define a first fluid flow passage extending between the second baffle plate and the baffle plate, the third baffle plate being positioned exterior of the second baffle plate so as to define a second fluid flow passage extending between the second baffle plate and the third baffle plate, the second baffle plate having at least one opening therealong fat enabling fluid communication between the first fluid flow passage and the second fluid flow passage, the third baffle plate having at least one opening therealong for enabling fluid communication between, the second fluid flow passage and the housing wall.

8. The gas generating system of claim 7, wherein the opening in the housing is spaced apart from the at least one opening in the third baffle plate, the at least one opening in the third baffle plate is spaced apart from the at least one opening in the second baffle plate, and the at least one opening in the second baffle plate is spaced apart from the at least one opening in the baffle plate, so as to provide a tortuous path for flow of a fluid between the first combustion chamber and the at least one opening in the housing wall and between the first combustion chamber and the at least one opening in the housing wall.

9. The gas generating system of claim 7 wherein the baffle plates are generally cylindrical.

10. The gas generating system of claim 9 wherein the at least two of the baffle plates are positioned coaxially within the housing.

11. A gas generating system comprising:
    a housing having an outer wall;
    a first combustion chamber;
    a second combustion clamber; and
    a baffle system positioned adjacent both the first and second combustion chambers so as to enable fluid communication with the first combustion chamber and the second combustion chamber upon activation of the gas generating system; and
    a fluid flow passage positioned interior of the housing wall and extending along at least a portion of at least one of the first combustion chamber and the second combustion chamber, the fluid flow passage being in fluid communication with the baffle system, the housing wall having at least one opening formed therein along the fluid flow passage for enabling fluid communication between the fluid flow passage and an exterior of the housing,
    so as to provide a fluid flow path from an of the first combustion chamber and the second combustion chamber through the baffle system and to the at least one housing wall opening upon activation of the gas generating system.

* * * * *

UNITED STATES PATENT AND TRADEMARK OFFICE
CERTIFICATE OF CORRECTION

| | | |
|---|---|---|
| PATENT NO. | : 7,814,838 B2 | Page 1 of 1 |
| APPLICATION NO. | : 11/167849 | |
| DATED | : October 19, 2010 | |
| INVENTOR(S) | : McCormick | |

It is certified that error appears in the above-identified patent and that said Letters Patent is hereby corrected as shown below:

Column 5, Line 57; Delete "by" and insert --bv--.

Column 9, Line 33; Delete "tetrazble" and insert --tetrazole--.

Column 20, Line 45; Delete "dish" and insert --disks--.

Column 26, Claim 7, Line 20; Delete "fat".

Column 26, Claim 7, Line 23; Delete "for".

Column 26, Claim 11, Line 59; Delete "an" and insert --any--.

Signed and Sealed this
Twenty-second Day of March, 2011

David J. Kappos
*Director of the United States Patent and Trademark Office*